United States Patent
Wen et al.

(10) Patent No.: US 10,942,614 B2
(45) Date of Patent: Mar. 9, 2021

(54) TERMINAL DEVICE AND METHOD FOR DISPLAYING AN ASSOCIATED WINDOW THEREOF

(71) Applicant: Samsung Electronics Co., Ltd., Suwon-si (KR)

(72) Inventors: Wei Wen, Beijing (CN); Guangfeng Yao, Beijing (CN); Bo Zhu, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/279,567

(22) Filed: Feb. 19, 2019

(65) Prior Publication Data

US 2019/0179492 A1  Jun. 13, 2019

Related U.S. Application Data

(63) Continuation of application No. 14/268,427, filed on May 2, 2014, now abandoned.

(30) Foreign Application Priority Data

May 6, 2013  (CN) .......................... 201310168074.1
Jul. 15, 2013  (CN) .......................... 201310301820.X

(51) Int. Cl.
*G06F 3/0484* (2013.01)
*G06F 3/0481* (2013.01)
*G06F 3/0488* (2013.01)

(52) U.S. Cl.
CPC ........ *G06F 3/0481* (2013.01); *G06F 3/04883* (2013.01); *G06F 2203/04803* (2013.01)

(58) Field of Classification Search
CPC ............... G06F 3/0484; G06F 3/04883; G06F 2203/04803
See application file for complete search history.

(56) References Cited

U.S. PATENT DOCUMENTS

| | | | |
|---|---|---|---|
| 5,596,700 A | 1/1997 | Darnell et al. | |
| 5,694,561 A | 12/1997 | Malamud et al. | |
| 6,108,714 A | 8/2000 | Kumagai et al. | |
| 7,676,761 B2 | 3/2010 | Oliver et al. | |

(Continued)

FOREIGN PATENT DOCUMENTS

| | | |
|---|---|---|
| CN | 101571826 A | 11/2009 |
| CN | 101778166 A | 7/2010 |

(Continued)

OTHER PUBLICATIONS

Korean Office Action dated Sep. 22, 2020, issued in Korean Patent Application No. 10-2014-0044669.

*Primary Examiner* — Andrea C Leggett
(74) *Attorney, Agent, or Firm* — Jefferson IP Law, LLP

(57) ABSTRACT

A method for displaying an associated window of a terminal device is provided. The method includes for a current window displayed, determining an associated window of the current window among at least a subset of all windows of the terminal device, and displaying the associated window together with the current window, wherein content displayed in the associated window is related to content displayed in the current window. When examples of the present disclosure are employed, windows associated with each other can be displayed simultaneously, interaction between a user and the device can be reduced, and system resources of the device can be saved.

16 Claims, 30 Drawing Sheets

(56) References Cited

U.S. PATENT DOCUMENTS

| | | |
|---|---|---|
| 8,042,110 B1 | 10/2011 | Kawahara et al. |
| 8,291,344 B2 | 10/2012 | Chaudhri |
| 8,683,362 B2 | 3/2014 | Shiplacoff et al. |
| 8,930,895 B2 | 1/2015 | Drukman et al. |
| 9,875,317 B2 | 1/2018 | Vasudevan et al. |
| 2005/0223334 A1 | 10/2005 | Guido et al. |
| 2005/0240873 A1 | 10/2005 | Czerwinski et al. |
| 2006/0146057 A1 | 7/2006 | Blythe |
| 2006/0161847 A1 | 7/2006 | Holecek et al. |
| 2006/0161860 A1 | 7/2006 | Holecek et al. |
| 2008/0005693 A1 | 1/2008 | Oliver et al. |
| 2008/0168401 A1 | 7/2008 | Boule et al. |
| 2010/0031198 A1 | 2/2010 | Zimmerman et al. |
| 2010/0095240 A1 | 4/2010 | Shiplacoff et al. |
| 2010/0248788 A1 | 9/2010 | Yook et al. |
| 2011/0252376 A1 | 10/2011 | Chaudhri |
| 2012/0290966 A1 | 11/2012 | Chae et al. |
| 2013/0179554 A1 | 7/2013 | Zhao |

FOREIGN PATENT DOCUMENTS

| | | |
|---|---|---|
| CN | 102099776 A | 6/2011 |
| CN | 102279694 A | 12/2011 |
| CN | 102438205 A | 5/2012 |
| CN | 102841811 A | 12/2012 |
| CN | 102968243 A | 3/2013 |
| CN | 102999358 A | 3/2013 |
| CN | 103198005 A | 7/2013 |
| KR | 10-2006-0079088 A | 7/2006 |
| KR | 10-2010-0107377 A | 10/2010 |

TERMINAL DEVICE AND METHOD FOR DISPLAYING AN ASSOCIATED WINDOW THEREOF

CROSS-REFERENCE TO RELATED APPLICATION(S)

This application is a continuation application of prior application Ser. No. 14/268,427, filed on May 2, 2014, which claimed priority under 35 U.S.C. § 119(a) of a Chinese patent application number 201310168074.1 filed on May 6, 2013 in the State Intellectual Property Office and a Chinese patent application number 201310301820.X filed on Jul. 15, 2013 in the State Intellectual Property Office the entire disclosure of each of which is hereby incorporated by reference.

TECHNICAL FIELD

The present disclosure relates to the technology of displaying a window on a terminal device. More particularly, the present disclosure relates to a terminal device and a method for displaying an associated window thereof In addition, the present disclosure relates to the technical field of terminal devices. More particularly, the present disclosure relates to a method and device for managing multi-task application programs.

BACKGROUND

Portable devices have penetrated into every aspect of people's lives, and portability of operations thereof has been well known to the public. In order to facilitate the use of a user, a portable device has already employed various methods to display a single window and multiple windows. According to the related art, the single window and the multiple windows displayed on the handheld device are all windows with a simple meaning However, the windows displayed on the portable device are all independent of each other, and do not have a relationship between each other. For example, the windows displayed on the portable device are not intelligent, and provide limited information to the user. Accordingly, the windows displayed on the portable device cannot easily and effectively satisfy demands of the user.

In recent years, with rapid development of the electronic industry and a communication technology, new businesses based on data, voice and video are developed rapidly. Rapid development of a microelectronics technology and a computer software and hardware technology lays the foundation for processing more and more complicated works by a terminal device, and provides a realizing possibility for the individualization of the terminal device to ensure that a terminal is free of the restriction of a network to some extent and further can have increasingly more complex functions. In addition, a user also expects that the function of the terminal is stronger, more flexible and convenient. Due to development of an information technology, a terminal technology trends to intellectualization, mobilization and multi-functionalization.

For example, a mobile phone is a portable device (e.g., mobile terminal) most familiar to people, and now, has become an object necessary for daily life of people. To ensure that people more conveniently use the mobile phone, growing capacity of an address book in the mobile phone, increasing linkmen and increasingly complicated information of the linkmen are needed. Sizes of screens are continuously enlarged and touch functions are also more and more sensitive. Intelligent terminals including mobile phones, computers, and the like have been popularized to more aspects in the life of people, people can perform communication, watch videos, read webpage news, and the like by using various intelligent terminals. In addition, the intelligent terminals have multiple functions and strong processing functions.

Generally, screens of the intelligent terminals are smaller, and when people use the intelligent terminal, a window of one application program in the intelligent terminal is only displayed generally in the screen. If windows of a plurality of application programs are displayed in a split-screen manner simultaneously, the size of each window in the screen is caused to be smaller, which may influence the ability of a user to watch and/or interact with content in the windows. If the screen of the intelligent screen is a touch screen, windows with smaller sizes, displayed in the split-screen manner, also may affect the ability of the user to touch or otherwise interact with the windows or content therein, which limits the experience of the user. If the window of one application program in the intelligent terminal is only displayed in the screen, when needing to switch to the next program, the user needs to operate the terminal to close a currently running program or switch the currently running program to a back end so as to ensure that the terminal exits the current application program, and further operates the terminal to open the next program needing to run. Thereafter, the terminal generates a window for the next program and displays the window in a terminal screen so as to realize that the application programs are switched. However, the process of switching the application programs is complicated to operate and low in efficiency.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a terminal device and a method for displaying an associated window thereof, so that windows associated with each other can be displayed simultaneously when windows are displayed, interaction between a user and the device can be reduced, and system resources of the device can be saved.

To achieve the above objective, the technical solution of the present disclosure is implemented as follows.

In accordance with an aspect of the present disclosure, a method for displaying an associated window of a terminal device is provided. The method includes for a current window displayed, determining an associated window of the current window from among at least a subset of all windows of the terminal device, and displaying the associated window together with the current window, wherein content displayed in the associated window are related to content displayed in the current window.

In accordance with another aspect of the present disclosure, the method further includes determining a capability label and an association label for each window, wherein the capability label identifies capability information of each window, and the association label identifies capability information of an associated window of each window, wherein the determining of the associated window of the current window comprises extracting an association label of the current window, and selecting, from other windows, a window for which a capability label matches the association label as the associated window of the current window.

In accordance with another aspect of the present disclosure, the pre-determining a capability label for each window includes at least one of configuring the capability label according to a property of a system control called by each window, customizing, by a user, the capability label of each window, and writing the capability label of each window into an application in which each window resides.

In accordance with another aspect of the present disclosure, the pre-determining an association label for each window includes at least one of customizing, by a user, the association label of each window, writing the association label of each window into an application in which each window resides, configuring the capability label according to a property of a system control called by each window, and automatically generating the association label of each window according to an operation of the user.

In accordance with another aspect of the present disclosure, the automatically generating the association label of each window according to an operation of the user includes if it is monitored that another window is displayed simultaneously when a window is displayed, recording a capability label of the other window, and taking the capability label as an association label of the window when the number of times of recording the capability label exceeds a preset threshold.

In accordance with another aspect of the present disclosure, the match between the capability label and the association label includes that the capability label is the same as the association label, or the capability label is a subset of the association label.

In accordance with another aspect of the present disclosure, the number of the associated window of the current window is one or more than one.

In accordance with another aspect of the present disclosure, a parameter value corresponding to the content displayed in the associated window is the same as a parameter value corresponding to the content displayed in the current window.

In accordance with another aspect of the present disclosure, the content displayed in the associated window is determined according to at least one of determining the association label of the current window associated with the associated window, extracting, from the content displayed in the current window, a parameter corresponding to the association label, and organizing the content displayed in the associated window according to the parameter.

In accordance with another aspect of the present disclosure, before organizing the content displayed in the associated window, the method further includes determining whether the parameter is complete, and prompting a user to input a completed parameter.

In accordance with another aspect of the present disclosure, the associated window is displayed in a manner of a control, a shrink window, or a fixed window.

In accordance with another aspect of the present disclosure, the displaying the associated window together with the current window includes one of simultaneously displaying the associated window and the current window according to a stitching mode according to which the associated window and the current window do not overlap each other, and displaying the associated window and the current window in a manner of covering the current window with the associated window.

In accordance with another aspect of the present disclosure, the associated window is displayed and hidden together with the current window, or the associated window is displayed and hidden according to an indication of a user.

In accordance with another aspect of the present disclosure, a terminal device is provided. The terminal device includes an associated window determining module configured to determine, for a current window displayed, an associated window of the current window from among at least a subset of all windows of the terminal device, and a window displaying module configured to display the associated window together with the current window, wherein content displayed in the associated window are related to content displayed in the current window.

In accordance with another aspect of the present disclosure, the associated window determining module includes a label determining sub-module and an association matching sub-module, wherein the label determining sub-module is configured to determine a capability label and an association label for each window, wherein the capability label identifies capability information of each window, and the association label identifies capability information of an associated window of each window, and the association matching sub-module is configured to extract an association label of the current window, and to select, from other windows, a window for which a capability label matches the association label as the associated window of the current window.

In accordance with another aspect of the present disclosure, the window displaying module includes an associated window content organizing sub-module and a displaying sub-module, wherein the associated window content organizing sub-module is configured to extract, from the content displayed in the current window, a parameter corresponding to the association label, and to organize the content displayed in the associated window according to the parameter, and the displaying sub-module is configured to display the organized content in the associated window together with the current window.

As can be seen from the above technical solution, in accordance with an aspect of the present disclosure, for a current window displayed, an associated window of the current window is selected from windows of the terminal device, and the associated window is displayed together with the current window, wherein content displayed in the associated window are related to content displayed in the current window. Therefore, windows associated with each other can be displayed simultaneously, interaction between a user and the device can be reduced, and system resources of the device can be saved.

Another aspect of the present disclosure is to provide a method and device for managing multi-task application programs, used for solving the problems of complicated operation and low efficiency in a process of switching the application programs by a terminal in the prior art.

In accordance with another aspect of the present disclosure, a method for managing multi-task application programs is provided. The method includes the steps of when starting any one application program in the associated program group, allocating running resources and window resources to each application program in the associated program group, running each application program in the associated program group in a corresponding window region according to the window resources, wherein the window region comprises a visible region and a non-visible window of a display screen.

In accordance with another aspect of the present disclosure, a device for managing multi-task application programs is provided. The device includes a resource allocating module configured to allocate running resources and window resources to each application program in the associated program group when starting any one application program in the associated program group and a running configured to run each application program in the associated program group in the corresponding window region according to the window resources, wherein the window region comprises a visible region and a non-visible window of a display screen.

According to the above technical scheme provided by the present disclosure, when the terminal runs the application programs in the associated program group, the terminal allocates running resources and window resources for each running program, further, when starting one application program, an application program associated with the above application program may automatically run in the non-visible window, so that when a user needs to switch to the associated application program, the switching between application programs that respectively correspond to the visible region and the non-visible window of the display screen and are already in the running state can be realized through directly switching the visible region and the non-visible window of the display screen, therefore, the waiting time of re-starting the application programs is reduced to ensure that the process of switching the application programs by the terminal is convenient and rapid, the efficiency of switching the application programs is increased, and the convenience of using the application programs by the user is improved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The same reference numerals are used to represent the same elements throughout the drawings.

Figure 1:
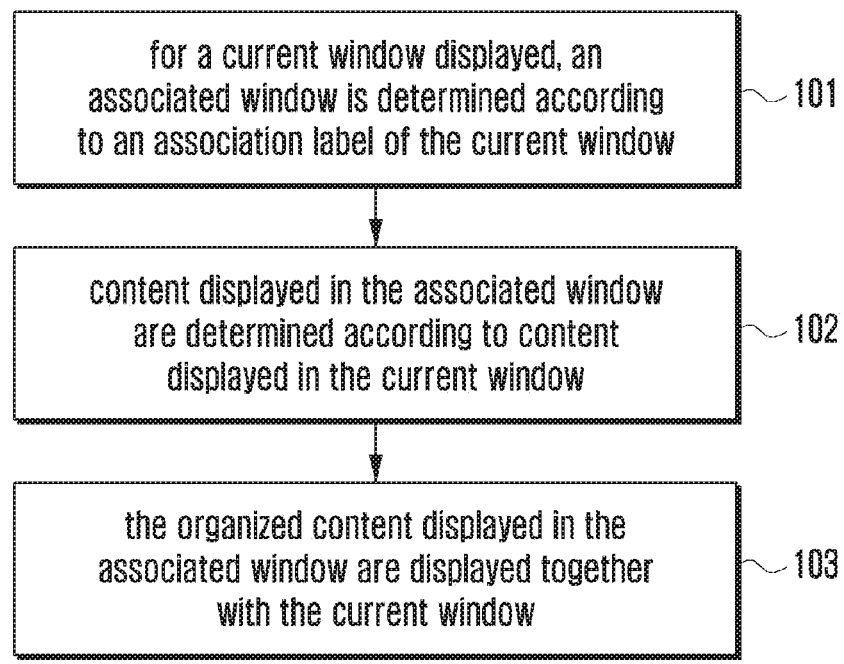
FIG. 1 is a flowchart illustrating a method for displaying an associated window according to an embodiment of the present disclosure.

The following description with reference to accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. It should be further understood that the terms "comprises/comprising" used in this specification specify the presence of stated features, integers, steps, operations, elements, and/or components, but do not preclude the presence or addition of one or more other features, integers, steps, operations, elements, components, and/or groups thereof It should be understood that when a component is referred to as being "connected to" or "coupled to" another component, it can be directly connected or coupled to the other element or intervening elements may be present. In addition, the "connected to" or "coupled to" may also refer to wireless connection or couple. As used herein, the term "and/or" includes any and all combinations of one or more of the associated listed items.

Unless otherwise defined, all terms (including technical and scientific terms) used herein have the same meaning as commonly understood by one of ordinary skill in the art to which the present disclosure belongs. It shall be further understood that terms, such as those defined in commonly used dictionaries, should be interpreted as having a meaning that is consistent with their meaning in the context of the relevant art and will not be interpreted in an idealized or overly formal sense unless expressly so defined herein.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

The method for displaying an associated window of an electronic device (e.g., a terminal device) in accordance with various embodiments of the present disclosure includes for a current window displayed, selecting an associated window of the current window from all of windows or part of the windows, displaying the associated window together with the current window. In this case, content displayed in the associated window are related to content displayed in the current window.

The window may be a unique user interface of an application, or may be one of various user interfaces of the application.

According to various embodiments of the present disclosure, the associated window may be selected through analyzing a type and content of information displayed in the current window.

According to various embodiments of the present disclosure, to select the associated window, a relationship label group is added for each window. The relationship label group includes a capability label and an association label of the window.

Among the relationship label group, the capability label defines capability information associated with a window, such as to display information, to call somebody, and/or the like. The capability label may be defined in the form of a figure, a character, and/or the like (e.g., a capability label of information may be "information"). There are several ways for configuring the capability label. For example, the capability label may be configured by directly writing the capability label of the window into an application in which the window is displayed. As another example, the capability label of the window may be configured by a system of the electronic device (e.g., the terminal device) according to a property of a system control called by the window. As another example, the capability label of the window may be customized by the user.

The association label defines a label associated with the window (e.g., capability information of the associated window of the window). In other words, the association label indicates which label may be displayed as the associated window when the window is displayed. The association label may be defined in the form of a figure, a character, and/or the like (e.g., an association label may be "information", which means that another window with the "information" capability may be displayed together with the window being displayed). There are several ways for configuring the association label. For example, the association label may be configured by directly writing the association label of the window into the application in which the window is displayed. As another example, the association label of the window may be customized by the user. As another example, the association label of the window may be automatically generated according to a user operation.

The association label of the window may be automatically generated according to the user operation by monitoring a user operation when window A is displayed, recording a capability label of window B when window B is displayed by the user together with window A, wherein the capability label of window B is used as a new capability label to be associated and configuring a new capability label to be associated as a new association label of window A when the system determines that the number of times of adding the new capability label to be associated exceeds a preset threshold.

The association label of the window may be updated according to requirements. For example, the association label may be updated by the application through an update package. As another example, the association label may be modified by the user. As another example, the association label of the window may be updated according a user operation, as generating the association label of the window according to the user operation described above.

When the association label and the capability label of the window are customized by the user, meaningless figures, character information and/or the like (e.g., various figures and/or character information otherwise having no association) may be configured as the association label and the capability label. When the association label and the capability label are matched, the associated window of the window may be selected.

Hereinafter, the method for displaying an associated window provided according to various embodiments of the present disclosure is described through an example. In this case, the method is explained taking the selection of the associated window using the association label and the capability label as an example.

FIG. 1 is a flowchart illustrating the method for displaying an associated window according to an embodiment of the present disclosure.

Referring to FIG. 1, at operation 101, for a current window displayed, an associated window is determined according to an association label of the current window.

For window A, a window of which a capability label is matched with an association label of window A is selected from other windows. In this case, the association window is selected based on a certain association label, wherein the association label may be one or several association labels of a plurality of association labels of window A specified by a user or by the system by default, or may be all of association labels of window A.

The match between the capability label and the association label may be divided into two types: a "strong association" and a "weak association". The strong association indicates that the association label of window A is exactly the same as the capability label of window B. For example, if the association label of window A is "information", and the capability label of window B is "information", then window A is determined to have a strong association with window B. The weak association indicates that there is a subset relationship between the association label and the capability label (e.g., a type of the association label of window A is a superclass of a type of the capability label of window B). For example, "micro-blog" is a subset of "social network." Accordingly, if the association label of window A is the social network, and the capability label of window B is the micro-blog, then window A is determined to have a weak association with window B.

The association matching process is not limited to a one-to-one relationship. For example, the application matching process may be a one-to-many relationship (e.g., one window may have a plurality of associated windows).

For example, window 1 is a contact window, association labels are information, a social network, and a telephone. Window 2 is an information window, and a capability label of window 2 is the information, which may display an information list of a designated contact. Window 3 is a social network window, and a capability label of window 3 is the social network, which may display micro-blog information of the designated contact. Window 4 is a call window, and a capability label of window 4 is the telephone, which may display call records of the contact, and may directly dial. When window 1 is displayed as a visible window, it is searched whether capability labels of other windows are matched according to the association label of window 1. A search result indicates that window 2 (information), window 3 (social network) and window 4 (call) are all matched with window 1. For example, window 2, window 3, and window 4 are all the associated windows of window 1.

At operation 102, content displayed in the associated window are determined according to content displayed in the current window.

For example, at operation 102, a parameter corresponding to the associated window is extract from the content displayed in the current window, and the content displayed in the associated window are organized in accordance with the parameter. In this case, a parameter value of the content displayed in the associated window is the same as a corresponding parameter value of the content displayed in the current window. For example, the current window is the contact window, the associated window is a micro-blog window, a corresponding parameter of the current window and the associated window is a name Assuming that a value of the name parameter corresponding to the content displayed in the current window is "Xiao Ming", then a value of the name parameter corresponding to the content displayed in the micro-blog window is also "Xiao Ming", and the content displayed in the micro-blog window is organized according to "Xiao Ming".

Specifically, when the corresponding parameter of the current window and the associated window is determined, a parameter type may be configured corresponding to each association label of the window. When the content displayed in the associated window are organized, a parameter value corresponding to the parameter type is extracted from the content displayed in the current window based on the parameter type corresponding to the association label, and the associated window organizes the content displayed in accordance with the parameter value.

For example, when window B is matched as the associated window of window A, the process for organizing the content displayed in window B may include determining an association label of window A associated with window B, and extracting a parameter corresponding to the association label from content displayed in window A. The parameter may be one or more than one. For example, when the association label is "information", a parameter type is a name, and a parameter value is configured as "Xiao Ming".

The process for organizing the content displayed in window B may also include determining whether the parameter is complete. If the parameter is not complete, then the user may be prompted to input the parameter. After the parameter is completely inputted, the window content may be prepared according to the association label and the associated parameter. For example, FIG. 2 illustrates preparing the content according to the label "information" and the parameter "Xiao Ming", and information records associated with Xiao Ming.

Figure 2:
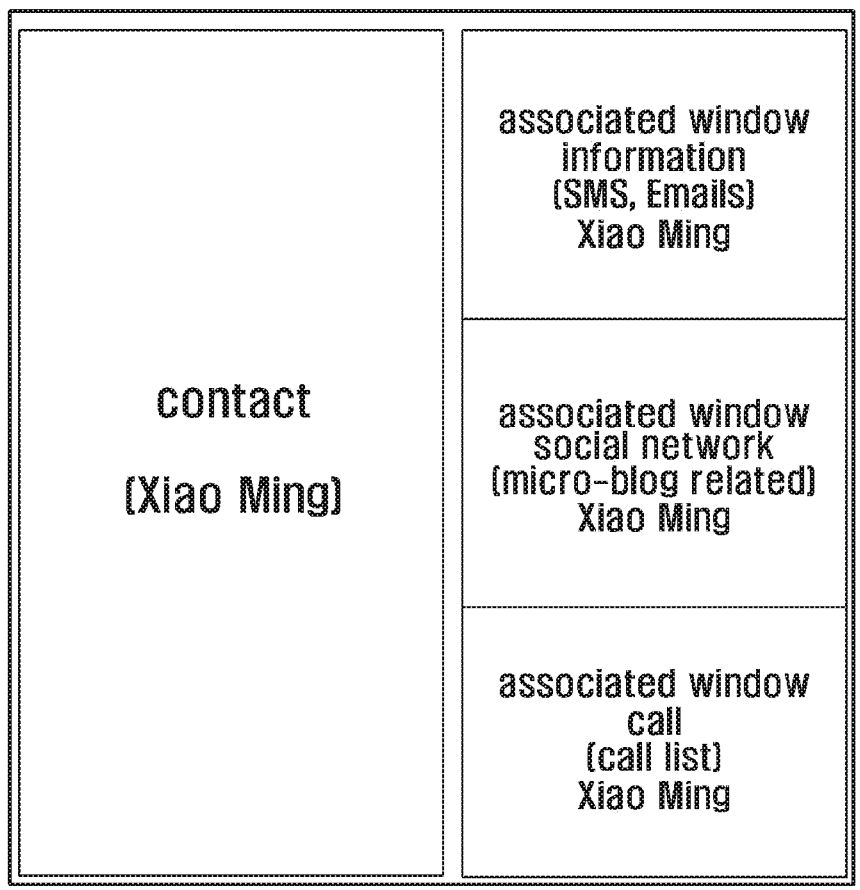
FIG. 2 is a schematic diagram illustrating organizing content displayed in an associated window according to an embodiment of the present disclosure.

FIG. 2 is a schematic diagram illustrating organizing content displayed in an associated window according to an embodiment of the present disclosure.

Referring to FIG. 2, the window displays contact information for Xiao Ming. An associated windows displays associated window information (e.g., Short Message Service (SMS) information, email information, and/or the like) relating to Xiao Ming. Another associated window displays social network information (e.g., micro-blog related information, and/or the like) relating to Xiao Ming. Another associated window displays associated window call information (e.g., a call list, a call log, and/or the like) relating to Xiao Ming.

At block 103, the organized content displayed in the associated window are displayed together with the current window.

A mode for displaying the associated window itself may include a control mode, a shrink window mode, and a fixed window mode.

The control mode may be used to display an associated window with a control type.

Figure 3:
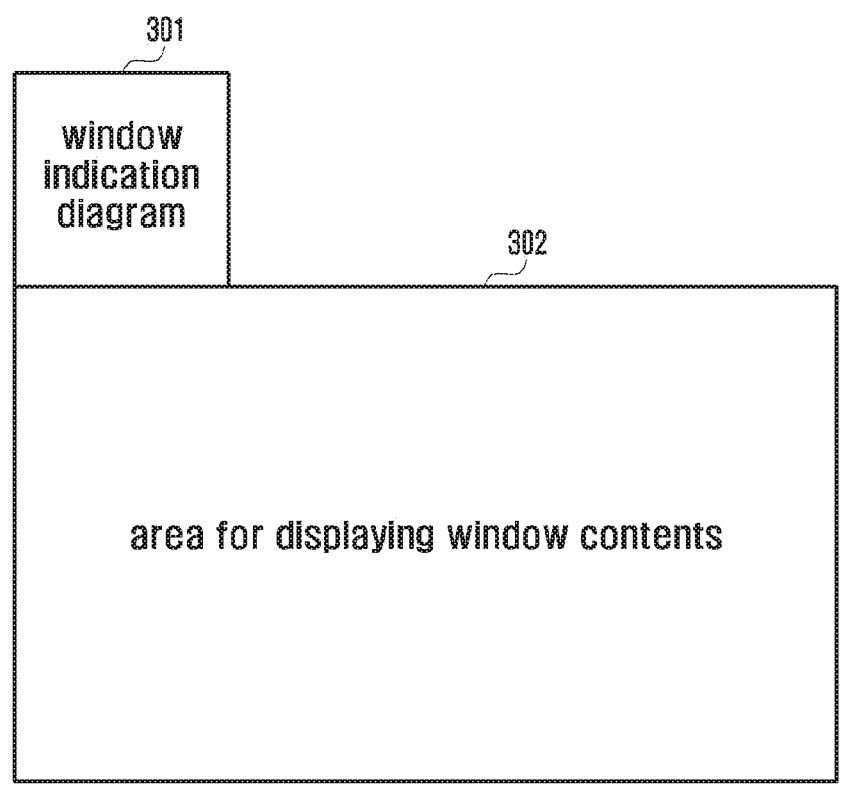
FIG. 3 is a schematic diagram illustrating displaying an associated window under a shrink window mode according to an embodiment of the present disclosure.

The shrink window may be used to display a standard window and a customized window, which may be displayed in two parts, as shown in FIG. 3.

FIG. 3 is a schematic diagram illustrating displaying an associated window under a shrink window mode according to an embodiment of the present disclosure.

Referring to FIG. 3, reference numeral 302 corresponds to an area for displaying window content, the displayed content may be the standard window, or may be the user-customized window, and this area may be displayed or hidden. Reference numeral 301 corresponds to a window indication diagram, which is a prompt of the area for displaying the window content, and may be either a thumbnail or an icon. A clicking (e.g., selection) operation may be performed to the window indication diagram 301. A display status of the area for displaying the window content may be shifted through clicking on the window indication diagram 301. The display status of the area for displaying the window content may be shifted to a hiding status after clicking on (e.g., selecting) the window indication diagram 301 when the display status is in a displaying status. The display status of the area for displaying the window content 302 may be shifted to the displaying status after clicking on (e.g., selecting) the window indication diagram 301 when the display status is in the hiding status.

Content displayed in the fixed window may be the standard window, or may be the user-customized window. The area of the fixed window is fixed. A display status of the fixed area cannot be shifted.

A display layout of the current window and the associated window may be configured according to requirements. An example of the present disclosure provides two kinds of display layout, one is a stitching mode, and the other is an overlapping mode.

Figure 4A:
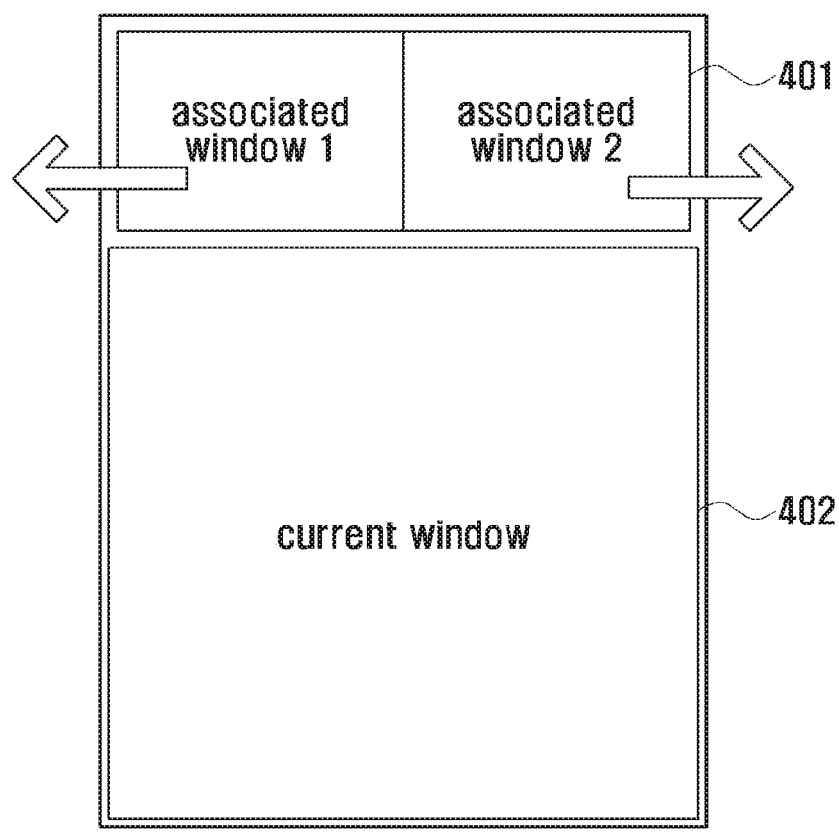
FIG. 4A is a schematic diagram illustrating a first window layout in a stitching mode according to an embodiment of the present disclosure.
Figure 4B:
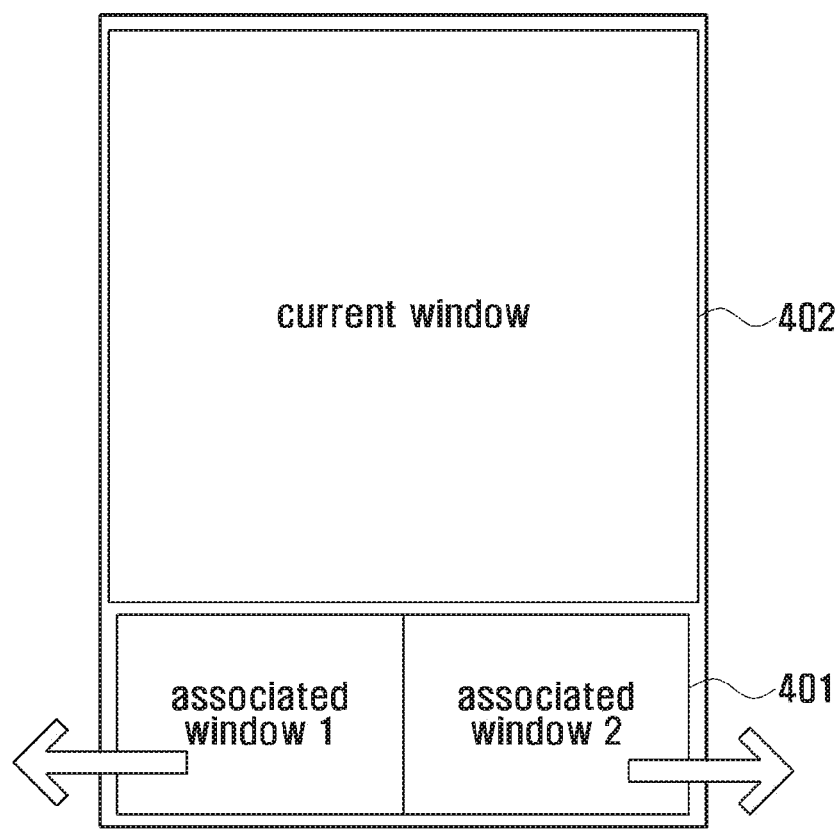
FIG. 4B is a schematic diagram illustrating a second window layout in a stitching mode according to an embodiment of the present disclosure.
Figure 4C:
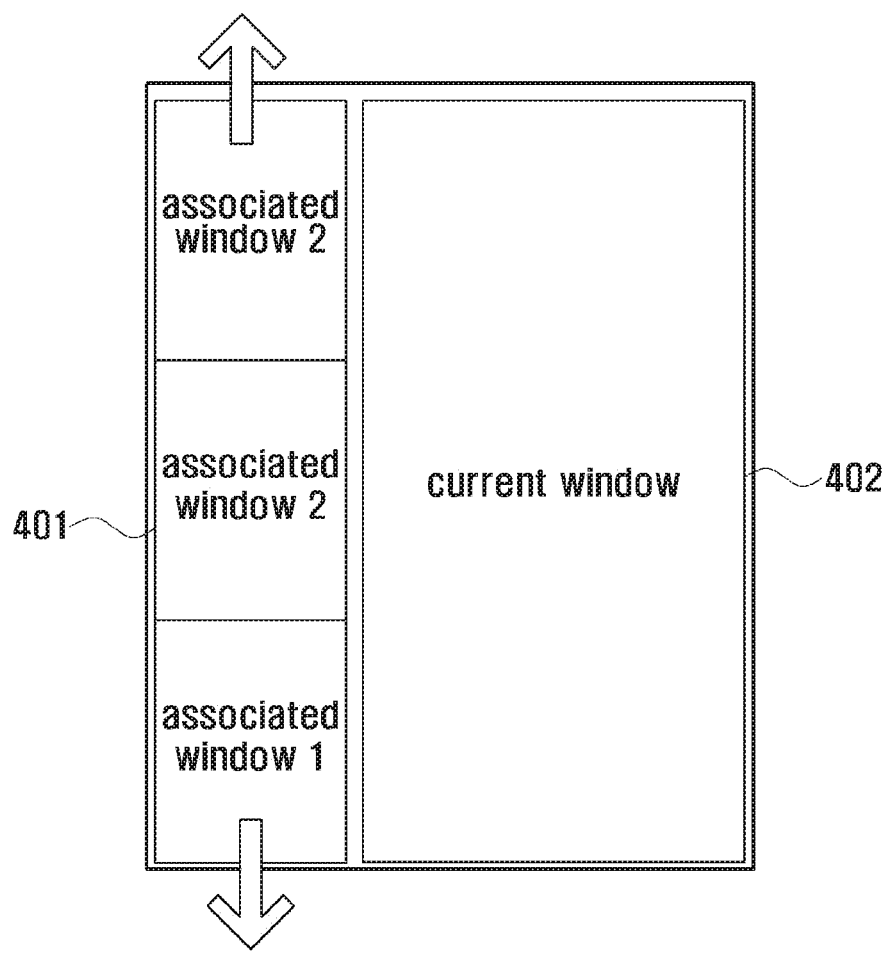
FIG. 4C is a schematic diagram illustrating a third window layout in a stitching mode according to an embodiment of the present disclosure.
Figure 4D:
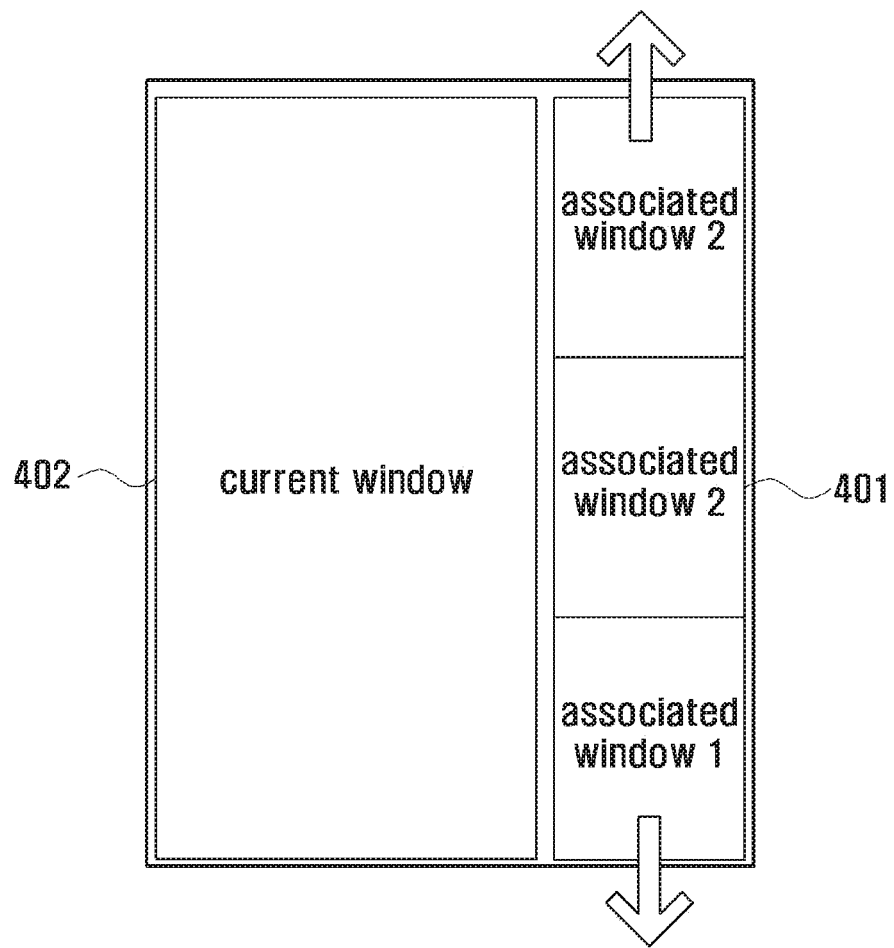
FIG. 4D is a schematic diagram illustrating a fourth window layout in a stitching mode according to an embodiment of the present disclosure.

FIGS. 4A to 4D are schematic diagrams illustrating a window layout in the stitching mode, which has four display forms, as shown in FIGS. 4A to 4D, respectively according to an embodiment of the present disclosure. FIG. 4A is a schematic diagram illustrating a first window layout in a stitching mode according to an embodiment of the present disclosure. FIG. 4B is a schematic diagram illustrating a second window layout in a stitching mode according to an embodiment of the present disclosure. FIG. 4C is a schematic diagram illustrating a third window layout in a stitching mode according to an embodiment of the present disclosure. FIG. 4D is a schematic diagram illustrating a fourth window layout in a stitching mode according to an embodiment of the present disclosure.

Referring to FIGS. 4A, 4B, 4C, and 4D, when display layout of the current window and the associated window are displayed under the stitching mode, an associated window group 401 displays all of associated windows. In this case, one associated window or multiple associated windows may be displayed. The associated window or multiple associated windows are stitched together. If the width of the window is wider than the display width, the associated window group 401 may be slid to display hidden parts. A current window 402 is also displayed. The current window and the associated window are not overlapped each other under the stitching mode.

There are two modes for displaying and hiding the associated window group under the stitching mode. One mode for displaying and hiding the associated window group under the stitching mode is an automatic mode, in which the associated window is automatically loaded when the current window 402 is displayed, and the associated window is automatically hidden when the current window 402 disappears. Another mode for displaying and hiding the associated window group under the stitching mode is a manual mode, in which the associated window group 401 may be slid to make the associated window group 401 display or disappear.

As illustrated in FIG. 4A, the associated window group 401 may be displayed above the current window 402. The associated window group 401 may be concurrently displayed with the current window 402. The associated window group 401 and the current window 402 may be tiled on the display. As illustrated in FIG. 4B, the associated window group 401 may be displayed below the current window 402. As illustrated in FIG. 4C, the associated window group 401 may be displayed to the left of the current window 402. As illustrated in FIG. 4D, the associated window group 401 may be displayed to the right of the current window 402.

Figure 5:
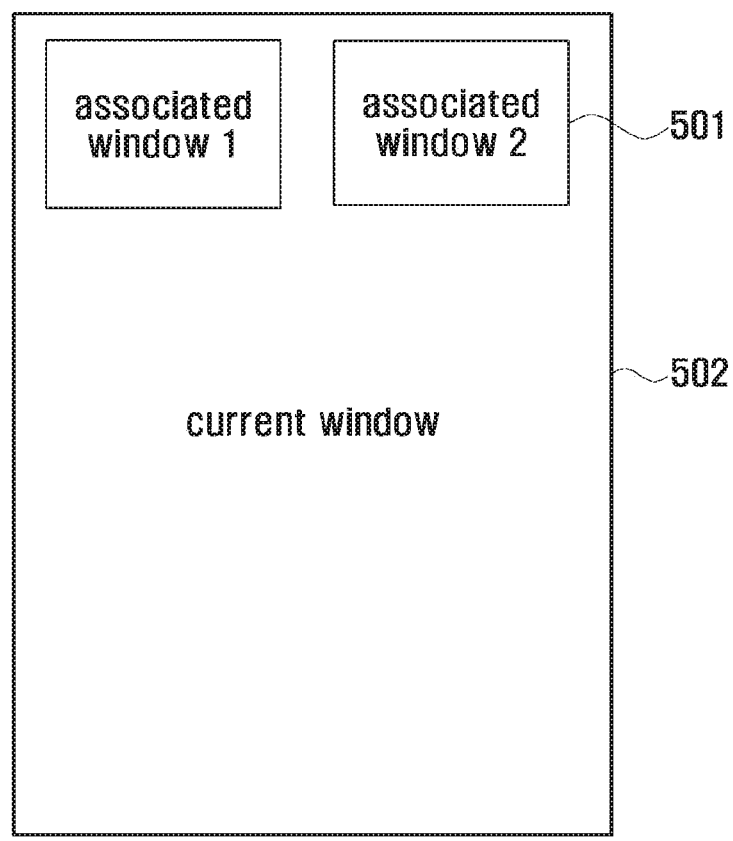
FIG. 5 is a schematic diagram illustrating a window layout in an overlapping mode according to an embodiment of the present disclosure.

FIG. 5 is a schematic diagram illustrating a window layout in the overlapping mode according to an embodiment of the present disclosure.

Referring to FIG. 5, a current window 502 is covered with an associated window group 501 under the overlapping mode. The associated window group 501 may be positioned anywhere within the window area through user input (e.g., dragging the associated window group 501 or subset of windows thereof). The associated windows may be overlapped with each other.

There are two modes for displaying and hiding the associated window. One mode for displaying and hiding the associated window is an automatic mode, in which the associated window is automatically loaded when the current window is displayed, and the associated window is automatically hidden when the current window disappears. Another mode for displaying and hiding the associated window is a manual mode, in which the associated window group 501 may be slid to make the associated window group 501 display or disappear.

In the above method for displaying the associated window, an application running under a single window mode is analyzed based on the convenience, and associated windows of a currently-displayed window are automatically generated according to content, a type, and a service capability association of the application. These associated windows may greatly enrich the content displayed and provide more information to the user. According to various embodiments of the present disclosure, a method for simultaneously performing group management to the current window and the associated window may be provided. According to various embodiments of the present disclosure, the content may be conveniently displayed to the user. Similarly, interaction between the user and the content may be convenient.

Various embodiments of the present disclosure provide an electronic device (e.g., a terminal device), to implement the above method for displaying the associated window.

Figure 6:
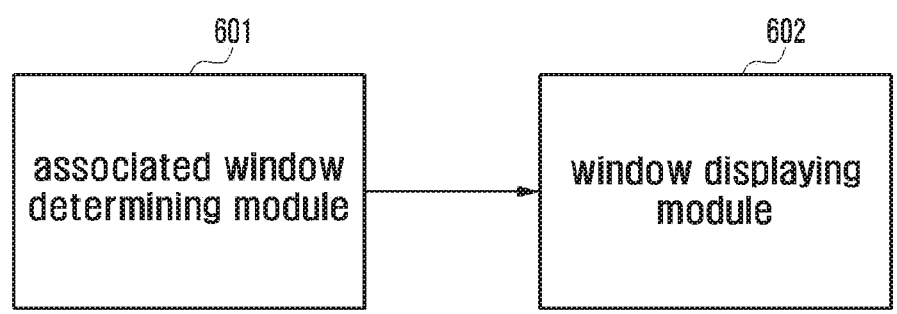
FIG. 6 is a schematic diagram illustrating a basic structure of an electronic device according to an embodiment of the present disclosure.

FIG. 6 is a schematic diagram illustrating a basic structure of an electronic device according to an embodiment of the present disclosure.

Referring to FIG. 6, the electronic device (e.g., the terminal device) includes an associated window determining module 601 and a window displaying module 602.

The associated window determining module 601 is configured to determine, for a current window displayed, an associated window of the current window from all of windows or part of the windows of the electronic device (e.g., the terminal device). The window displaying module 602 is configured to display the associated window together with the current window. In this case, content displayed in the associated window is related to content displayed in the current window.

Specifically, the associated window determining module 601 may include a label determining sub-module and an association matching sub-module. The label determining sub-module may be configured to pre-determine a capability label and an association label for each window. The association matching sub-module may be configured to extract an association label of the current window, and to select, from other windows, a window of which a capability label matches the association label as the associated window of the current window.

The window displaying module 602 may include an associated window content organizing sub-module and a displaying sub-module. The associated window content organizing sub-module may be configured to extract, from the content displayed in the current window, a parameter corresponding to the association label, and to organize the content displayed in the associated window according to the parameter. The displaying sub-module may be configured to display the organized content in the associated window together with the current window.

Hereinafter, two examples of displaying the associated window are described.

The first example of displaying the associated window is to generate and display a contact window and associated windows thereof.

It is assumed that association labels of the contact window are micro-blog and information. A capability label of a micro-blog window is "micro-blog", which may list micro-blogs of a designated topic. A capability label of an information window is "information", which may list a SMS, a Multimedia Message Service (MMS), and an e-mail list of a designated contact.

Figure 7:
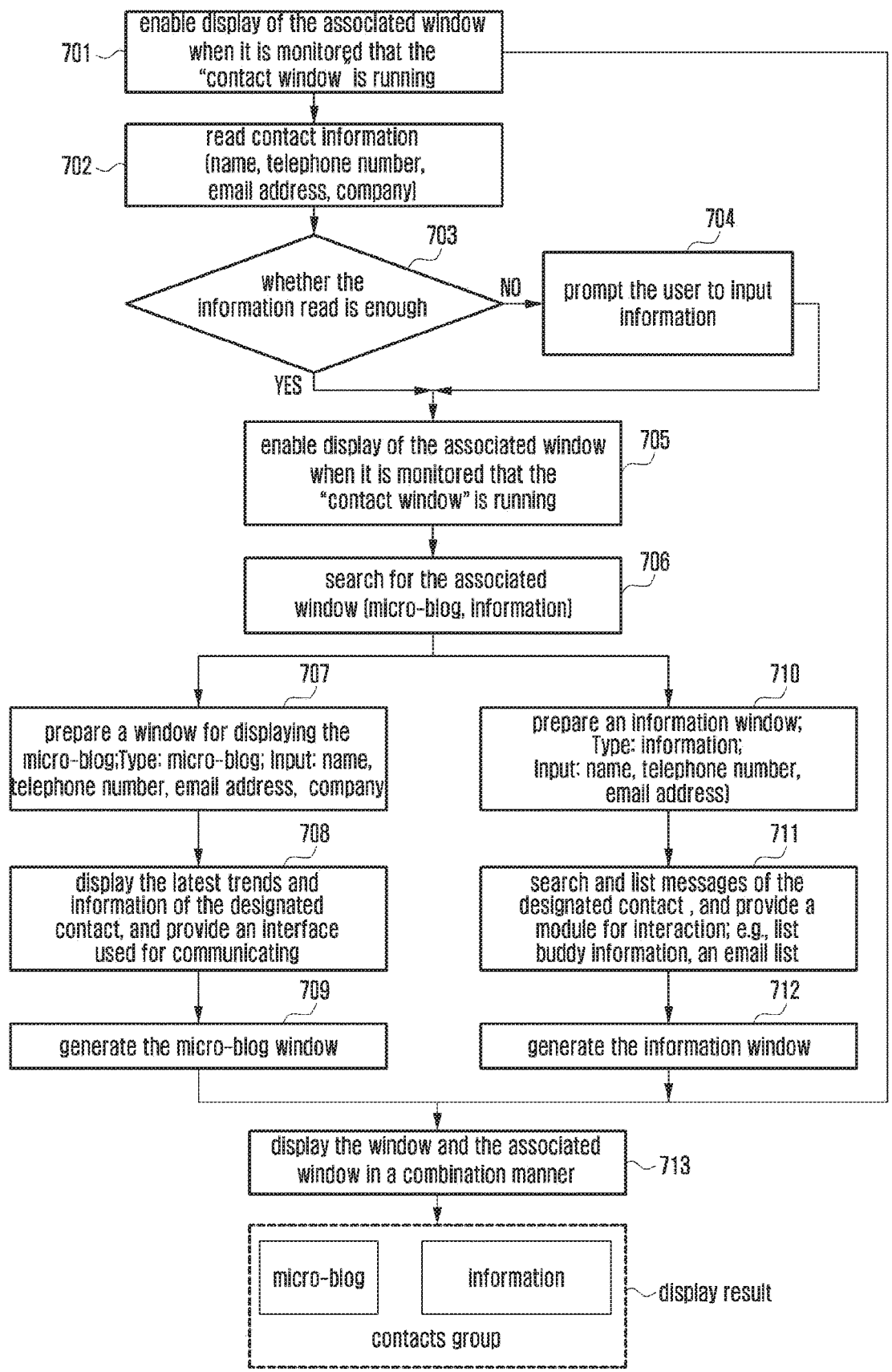
FIG. 7 is a flowchart illustrating a process for displaying an associated window according to an embodiment of the present disclosure.

FIG. 7 is a flowchart illustrating a process for displaying an associated window according to an embodiment of the present disclosure.

Referring to FIG. 7, at operation 701, display of the associated window is started when it is monitored (e.g., determined) that the "contact window" is running At operation 702, contact information displayed in the contact window is read. The contact information includes but is not limited to a name, a telephone number, an email address, an avatar, a company, and/or the like.

At operation 703, it is determined whether the information is sufficiently read. For example, the electronic device may determine whether the contact information displayed in the contact window is sufficiently read (e.g., the amount of information read exceeds a preset threshold).

If the information is determined not to have been sufficiently read at operation 703, then at operation 704, a user is prompted to input contact-related information. It is assumed that the information obtained is "Xiao Ming (xiaomin@email.com, 010-10101010), Zhang San (zhangsan@email.com), Li Si (13411110000)". Thereafter, the process for displaying an associated window may proceed to operation 705.

If the information is determined to have been sufficiently read at operation 703, the process for displaying an associated window may proceed to operation 705.

At operation 705, the association labels of the "contact window" are read after sufficient contact information (e.g., an amount of contact information exceeding a preset threshold) is obtained. In this example, the association labels read are "micro-blog" and "information". Display of the associated window is enabled when the contact window is determined to be running At block 706, a search is performed for the associated window (e.g., micro-blog, information, and/or the like). For example, windows of which capability labels have "micro-blog", "information" or a subset thereof are searched for in an electronic device (e.g., a terminal device). The associated windows are prepared taking a type and the contact information as input after the appropriate windows are searched.

At operation 707, a window for displaying the micro-blog is prepared. The window for displaying the micro-blog may be prepared using the type "micro-blog" and the content "Xiao Ming (xiaomin@email.com, 010-10101010), Zhang San (zhangsan@email.com), Li Si (13411110000)" and/or the like as inputs.

At operation 708, it is determined whether the designated contact belongs to micro-blog buddies based on the input content. If the designated contact belongs to the micro-blog buddies, the latest trends and information of the designated contact is displayed, and an interface used for communicating and sending user comments is provided.

At operation 709, the "micro-blog window" is generated based on the prepared content.

At operation 710, the "information window" is prepared. The information window may be prepared using taking the type "information" and the content "Xiao Ming (xiaomin@email.com, 010-10101010), Zhang San (zhangsan@email.com), Li Si (13411110000)" and/or the like as an input.

At operation 711, a search is performed of the messages of the designated contact. For example, messages of the designated contact are searched in the SMS, the MMS, and the emails. If messages of the designated contact exist, the messages are grouped for listing, and a module for interaction is provided. A list of messages of the designated contact may be generated.

At operation 712, the "information window" is generated based on the prepared content.

At operation 713, the two associated windows (e.g., the "micro-blog window" and the "information window") generated at operations 709 and 712, and the "contact window" currently displayed are displayed in the form of combination, and an operation mode for interaction is provided.

The second example of displaying the associated window is to generate and display a video player and associated windows thereof.

It is assumed that association labels of a video player window are micro-blog and news reading. A capability label of a micro-blog window is "micro-blog", which may list micro-blog of a designated subject. A capability label of a news reading window is "news reading", which may list related news of the designated subject.

Figure 8:
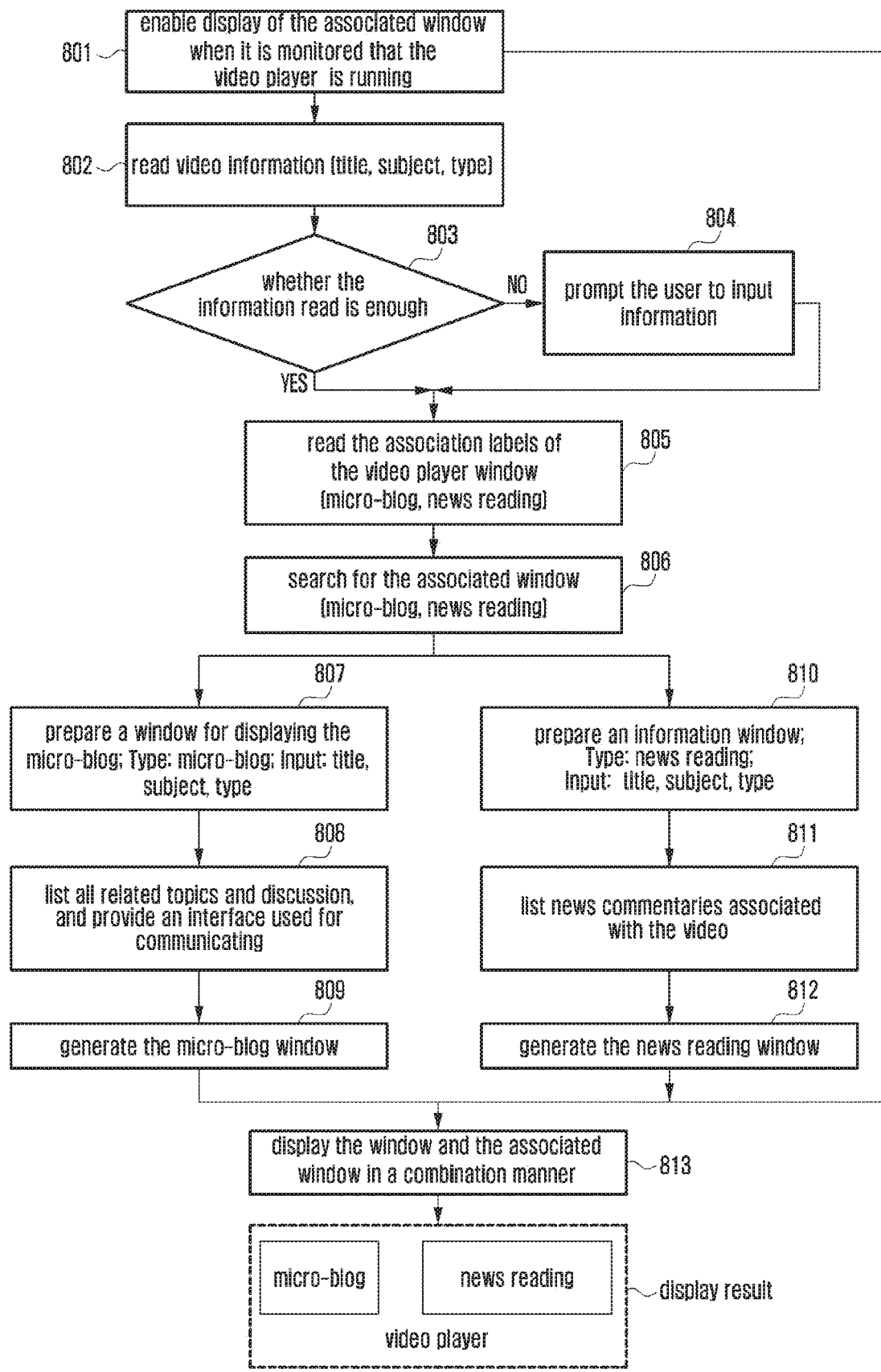
FIG. 8 is a flowchart illustrating a process for displaying an associated window according to an embodiment of the present disclosure.

FIG. 8 is a flowchart illustrating a process for displaying an associated window according to an embodiment of the present disclosure.

Referring to FIG. 8, at operation 801, display of the associated window is started when it is monitored (e.g., determined) that the "video player window" is running.

At operation 802, video information is read. The video information includes but is not limited to a subject, a format, a title, and/or the like.

At operation 803, it is determined whether the information is sufficiently read. For example, the electronic device may determine whether the information is sufficiently read (e.g., the amount of information read exceeds a preset threshold).

If the information is determined not to have been sufficiently read at operation 803, then at operation 804, a user is prompted to input video-related information. It is assumed that the information obtained is "movie A". Thereafter, the process for displaying an associated window may proceed to operation 805.

If the information is determined to have been sufficiently read at operation 803, the process for displaying an associated window may proceed to operation 805.

At operation 805, the association labels of the video player window are read after sufficient video information (e.g., an amount of video information exceeding a preset threshold) is obtained. In this example, the association labels read are "micro-blog" and "news reading".

At operation 806, windows of which capability labels have "micro-blog", "news reading" or a subset thereof are searched for in an electronic device (e.g., a terminal device). The associated windows are prepared taking a type and the video information as input after the appropriate windows are searched.

At operation 807, a window for displaying the micro-blog is prepared. The window for displaying the micro-blog may be prepared using the type "micro-blog", the content "movie A" and/or the like as an input.

At operation 808, all of topics about the "movie A" in the micro-blog are listed, content about the "movie A" discussed among buddies are listed, and a communication interface is provided to send user comments.

At operation 809, the "micro-blog window" is generated based on the prepared content.

At operation 810, the "news reading window" is prepared. The news reading window may be prepared using the type "news reading", the content "movie A", and/or the like as an input.

At operation 811, all of news, film reviews, propaganda information, and/or the like, about the "movie A" is listed through searching the network.

At operation 812, the "news reading window" is generated based on the prepared content.

At operation 813, the two associated windows (e.g., the "micro-blog window" and the "news reading window" generated at operations 809 and 812), and the "video player window" currently displayed are displayed in the form of combination, and an operation mode for interaction is provided.

The following various embodiments of the present disclosure provide a method for managing multitask application programs. The current windows and associated windows can be generated based on equals to or more than one application program and be displayed by a visible region (e.g., visible window) or a non-visible region (e.g., non-visible window).

Figure 9:
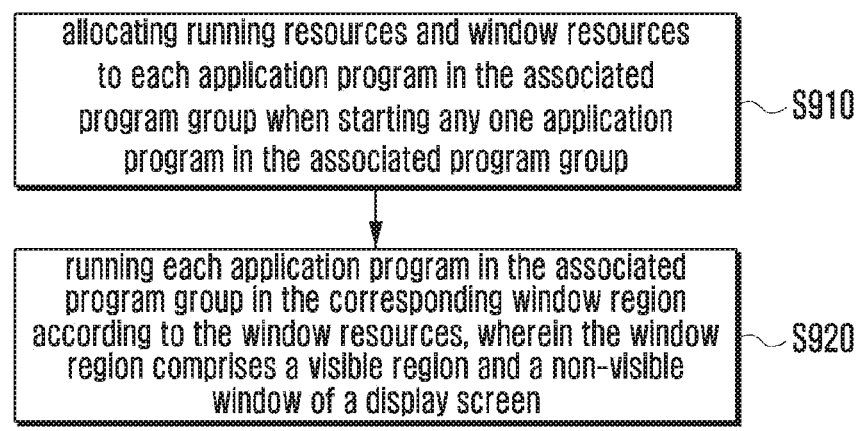
FIG. 9 is a flow diagram of the method for managing multi-task application programs according to an embodiment of the present disclosure.

Various embodiments of the present disclosure provide a method for managing multi-task application programs. and as shown in FIG. 9, the schematic diagram shows that the method FIG. 9 is a flow diagram of the method for managing multi-task application programs according to an embodiment of the present disclosure.

Referring to FIG. 9, at operation S910, when starting any one application program in the associated program group, running resources and window resources are allocated to each application program in the associated program group.

At operation S920, each application program in the associated program group in the corresponding window region is executed (e.g., run). The window region may comprise a visible region and a non-visible window of a display screen.

As mentioned above, each application program in the associated program group runs in the corresponding window region, may run in the visible region of the display screen, and also may run in the non-visible window of the display screen. According to various embodiments of the present disclosure, application programs may run in different windows:

According to an embodiment of the present disclosure, the application program running in the visible region may run according to the prior running mode, may run according to preset information, or may run according to operation information of the user. The preset information may be information of indicating that the application program runs to a set state or set result. An example of using the application program as the video, and a specific running mode is described. For example, if the application program runs according to the prior running mode, generally, after starting video playing software, currently selected video is played. As another example, if the application program runs according to the preset information, and if the preset information indicates that the current video is played for 10 min, then the currently selected video is played for 10 min. As another example, if the application program runs according to the operation information of the user, a corresponding running interface is executed according to the choice of the user (e.g., according to user input, user configurations or preferences, and/or the like). For example, if the operation information of the user is pause of the video, then the video is paused. As another example, if the operation information of the user is play far forward, then the video is played in a far forward manner according to the operation of the user.

According to an embodiment of the present disclosure, the application program running in the non-visible window may run according to information output by the visible region, may run according to a mode of running in the visible region, or may run according to preset information. An example of using an application program as a video, and a specific running mode is described. For example, if the application program runs according to the information output by the application program running in the visible region, then an interface related to the information output by the visible region is loaded according to the information (e.g., if information input by the application program in the visible region is English language teaching, videos related to English language teaching are loaded by video software running in the non-visible region according to the information), and a more detailed description can refer to the application programs running in a cooperative mode, described subsequently. As another example, if the application program runs according to the mode of running in the visible region, generally, after video playing software is started, the currently selected video is played. The mode is basically same with a process that the application program runs in the visible region, and the difference therebetween is that the application program running in the mode may not be displayed in the visible region. As another example, if the application program runs according to the preset information, and if the preset information indicates that the current video is played for 10 min, then the currently selected video is played for 10 min.

It should be understood that the various embodiments of the present disclosure described above are only exemplary. For example, the running modes of the application programs in the visible region and the non-visible window can be flexibly defined in practical application.

According to various embodiments of the present disclosure, the associated program group comprises one or more application programs, when any one application program in the associated program group is detected, running resources and window resources are allocated to each application program in the associated program group; and then each application program in the associated program group runs in the corresponding window region. The window region may comprise a visible region and a non-visible window of a display screen.

For example, when the associated program group only comprises one application program, running resources allocated to the application program comprise Central Processing Unit (CPU) resources, internal memory resources, and/or the like. As another example, when the associated program group only comprises one application program, window resources allocated to the application program comprise a visible region and a non-visible window of a display screen (e.g., the application program is displayed in the visible region and/or non-visible window of the display screen). The window resources allocated to the application program can be completely occupied, and the unoccupied window region may also exist (e.g., the application program does not completely occupy the window resources allocated to the application program from the start).

For example, when the associated program group comprises two application programs, window resources allocated to the application programs comprise a visible region and two non-visible windows of the display screen. During running, one application program is displayed in the visible region of the display screen, the other one application program runs in one non-visible window (which is invisible for the user), and no application program runs in the other non-visible window (the window resources can be used by other application programs).

According to various embodiments of the present disclosure, when the terminal runs the application programs in the associated program group, running resources and window resources are allocated to each running program, switching between application programs respectively corresponding to the visible region and the non-visible window(s) of the display screen can be realized through switching the visible regions and the non-visible windows of the display screen to ensure that the process of switching the application programs by the terminal is convenient and rapid. Accordingly, the efficiency of switching the application programs is increased, and the convenience for use of the user is improved.

Various details in the operations S910 and S920 are further described as below, and various embodiments of the present disclosure are introduced by combining with specific examples.

At operation S910, when starting any one application program in the associated program group, running resources and window resources are allocated to each application program in the associated program group.

At operation S910, when a system of an electronic device (e.g., a terminal device) detects that any one application program in the associated program group is started, running resources and window resources are allocated to each application program in the associated program group.

According to various embodiments of the present disclosure, the window resources allocated to the application programs generally refer to window regions allocated to the application programs during running The window regions can be visible regions of the display screen, can be seen by the user, and can also be non-visible windows. When the application programs running in the non-visible windows are switched to run in the visible regions of the display screen, the application programs running in the non-visible windows may be seen by the user.

According to various embodiments of the present disclosure, the window resources allocated to the application programs may include location parameters of the window regions, and/or the like.

For example, the location parameters of the window regions may include coordinates of all peaks of the window regions, coordinates of centers of the window regions and distances between all sides and the centers of the windows, and/or the like.

According to various embodiments of the present disclosure, with a rectangular window as an example, to be specific, the location parameters of the window regions may include window width, window height, coordinates of a window reference point, and/or the like. The window reference point can be a center point, a top-left corner, a top-right point, a bottom-left corner or bottom-right corner of the window.

According to various embodiments of the present disclosure, for each window region, location information of the window region can be marked through 5 basic parameters, respectively coordinates of the top-left corner, including coordinates of X axis, coordinates of Y axis, coordinates of Z axis, width W and height H of the window. When the window resources are allocated to the application programs, program parameters are read, 5 pieces of key information (x, y, z, w and h) of each program are determined, and the window regions are allocated to the application programs. For example, x represents a coordinate of the X axis, y represents a coordinate of the Y axis, z represents a coordinate of the Z axis, w represents width of the window, and h represents height of the window.

Figure 10:
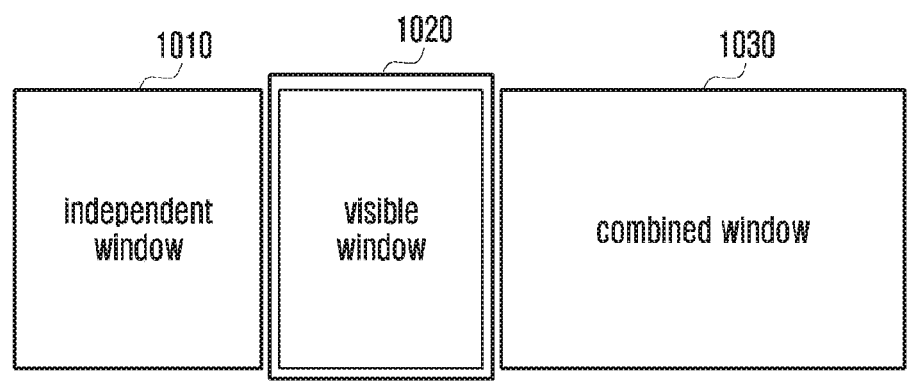
FIG. 10 is an example of allocated window resources according to an embodiment of the present disclosure.

FIG. 10 is an example of allocated window resources according to an embodiment of the present disclosure.

Referring to FIG. 10, a terminal system (e.g., an electronic device) allocates three window regions for the application programs, respectively an independent window 1010, a visible window 1020 and a combined window 1030. The visible window 1020 is a visible region of a display screen, and the independent window 1010 and the combined window 1030 are non-visible windows. Therefore, generally, the window regions may be divided into two types, one type is a visible window (e.g., the window capable of being seen in the present terminal screen); and the other type is an off-screen window (e.g., the window incapable of being seen in the present terminal screen). Referring to FIG. 10, the independent window 1010 and the combined window 1030 belong to the off-screen windows (the off-screen windows described in the subsequent various embodiments of the application and the non-visible windows may have same meanings). Furthermore, the off-screen windows can be divided into two types, one type is the independent window 1010, the size of which is equal to that of the visible window; and the other type is the combined window 1030, one side of which is equal to the visible window in size and the other side is an integral multiple of the visible window. Generally, the off-screen windows may be respectively distributed in the left side, right side, upper side or lower side of the visible window. Referring to FIG. 2, coordinates Z and heights H of all window regions are same, and different display states of the window regions are controlled through controlling the difference of the coordinates x on the X axis.

According to various embodiments of the present disclosure, the terminal system needs to set location parameters for each window region, the terminal determines display locations, overlapping sequences and the like of the window regions in a terminal screen according to the location parameters of the window regions. For example, a three-dimensional coordinate system may be set in a terminal screen, and comprises an X axis, a Y axis and a Z axis. The display locations and the overlapping sequences of the window regions may be determined by using coordinates (x, y, z) of the centers of visible windows in the three-dimensional system. The display locations of the window regions may be determined by coordinates (x, y) of the centers of the visible windows. The overlapping sequences of the window regions may be determined by using coordinates z of the centers of the visible windows. The larger the coordinates of the centers of the window regions are, the closer to the user the display positions of the visible windows in the terminal screen are.

Figure 11:
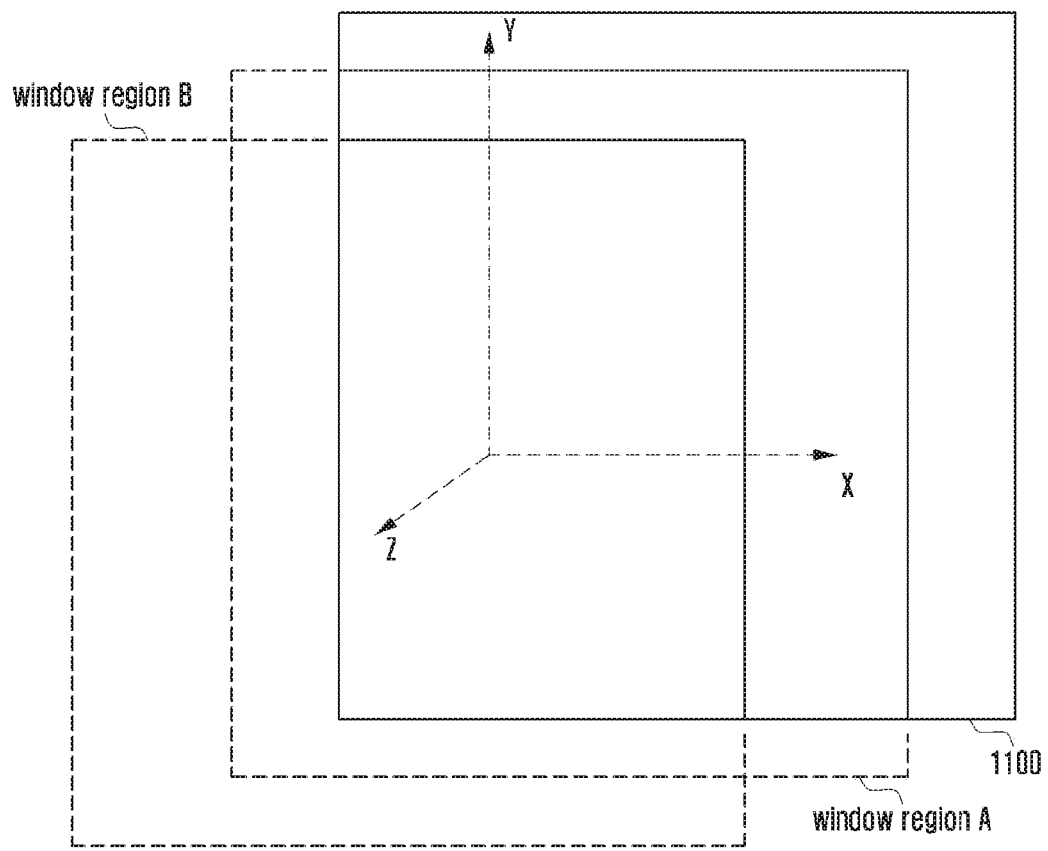
FIG. 11 is an example of allocated window resources according to an embodiment of the present disclosure.

FIG. 11 is an example of allocated window resources according to an embodiment of the present disclosure.

Referring to FIG. 11, two window regions are displayed in the terminal screen 1100, respectively a window region A and a window region B. The window region A and the window region B are partially displayed. Coordinate zB of the window region B is greater than coordinate zA of the window region A, therefore, the location of the window region B in the terminal screen 1100 is closer to a user in the front end of the terminal screen 1100. Because coordinates of the window region A and the window region B on the X axes and the Y axes are different, the state in FIG. 11 is shown. For example, the window region B is in the bottom-left corner of the window region A, and partial region in the top-right corner of the window region A is only displayed (the rest of the window region A is covered by the window region B).

According to various embodiments of the present disclosure, the user may also set the height H and the width W of the visible window according to the placing manner of the terminal screen 1100 so as to ensure that the size of the visible window accords with the actual demand of the user. For example, when the terminal screen adopts a horizontal screen display mode and a vertical screen display mode, the height H and the width W of the visible window may be changed according to the size of the terminal screen so as to ensure that the terminal screen 1100 is full with the visible window, and thus the user conveniently interacts information with the visible window.

Therefore, it should be understood that the location parameters of the window regions, defined in the present disclosure, are parameters capable of uniquely determining the window regions.

Various embodiments of the present disclosure may include setting at least two application programs as an associated program group according to the choice of a user. Various embodiments of the present disclosure may include setting at least two application programs as an associated program group according to the predefined rule.

According to various embodiments of the present disclosure, the associated program group comprises one or more application programs. Therefore, when the application programs in the associated program group are started, a system may determine that at least two application programs belong to the same associated program group.

For example, the user sets a plurality of associated application programs to one associated program group before. According to various embodiments of the present disclosure, the user judges that after some application program runs, the other one application program is generally needed to run according to the previous use habit. Therefore, the user sets the two application programs as the associated program group. The plurality of application programs set as the associated program group will be automatically run. Therefore, the problem of inconvenience experienced by the user before is solved For example, when being needed to be started after one application program is solely started, the other application program can be started without interrupting the current application program.

Meanwhile, the system may also set at least two application programs as the associated program group according to the predefined rule. For example, when monitoring that the user usually starts some application program, generally, the user also expects to use other application programs, and relevant application programs are automatically set as the same associated program group.

Various embodiments of the present disclosure may further include, after the application programs in the associated program group run, the terminal system (e.g., electronic device) may also dynamically add other application programs in the associated program group to ensure that the application programs in the associated program group can interact. Adding the other application programs in the associated program group may include setting at least two application programs as an associated program group according to the choice of the user. In addition, or as an alternative, adding the other application programs in the associated program group may include setting at least two application programs as an associated program group according to the predefined rule.

The predefined rule, for instance, comprises application programs with use frequencies reaching a predefined threshold, application programs with functions approaching those of the same types, and application programs commonly used by the user last time.

For example, the current associated program group comprises two application programs, one is a video playing program and the other one is an instant messaging QQ chat program; when the application programs in the associated program group are started, allocated window resources are three window regions (e.g., no application program runs in one window region). When the user uses the application programs in the associated program group, the third application program also needs to be started, and the third application program and the previous two application programs are set as the associated program group according to the choice of the user or predefined rule so as to bring the convenience for the user. For instance, if the third application program is an electronic mail service program, when the user receives a new mail, the electronic mail service program runs in the third window region according to the choice of the user or predefined rule. The user can switch among the video playing program at will, the instant messaging QQ chat program and the electronic mail service program, uses one of the programs as the visible window or carries out data information interaction among the three application programs, and/or the like.

In addition, the terminal system may dynamically adjust the window resources according to the running condition of the associated program group when finding that a new application program is added in the associated program group. For example, the current associated program group comprises two application programs, one is a video playing program and the other one is an instant messaging QQ chat program. When the application programs in the associated program group are started, allocated window resources are two window regions. When finding that an electronic mail service program as the third application program needs to be started, the terminal system allocates a third window region for the electronic mail service program so as to ensure that the three application programs form the associated program group. The user can realize the random switching among the video playing program, the instant messaging QQ chat program and the electronic mail service program as well, uses one of the programs as the visible window or carries out data information interaction among the three application programs, and/or the like.

The embodiment disclosed by the present disclosure solves the problem that one application program only runs in a terminal screen. When people need to switch to the next program, the user does not need to operate a terminal to close the currently running program or switch the currently running program to a back end, the terminal does not need to exit the current application program, a plurality of application programs run in parallel, and the switching between the application programs respectively corresponding to the visible region and the non-visible window of the display screen can be realized, therefore, the process of switching the application programs is simple and rapid, and the efficiency of switching the application programs is increased.

According to various embodiments of the present disclosure, allocating window resources to each application program in the associated program group may include one or more of selecting corresponding window regions for the application programs according to the setting of the user, selecting corresponding window regions for the application programs according to utilization frequencies of the application programs, selecting corresponding window regions for the application programs according to the running state of the system, and/or the like.

For example, selecting of the corresponding window regions for the application programs according to the setting of the user may correspond to the user selecting application programs from a program list of the associated program group, then appointing screen locations in which the application programs are displayed to the application programs, or appointing window regions in which the application programs run. The selecting of the corresponding window regions for the application programs according to the setting of the user may further correspond to the terminal system recording and storing a location relationship of the window regions, arranging the window regions by using an arrangement mode set by the user when the terminal re-starts the application programs so as to bring the convenience for allocating the window resources according to the mode selected per se, therefore the use experience of the user is improved.

For example, selecting of the corresponding window regions for the application programs according to the utilization frequencies of the application programs may include installing an application program directly started by the user in the visible region of the display screen, and sequentially installing other application programs in non-visible windows beyond the visible region of the display screen according to the utilization frequencies.

In a process of using the terminal, the utilization frequencies of the application programs in the associated program group within a certain period can be respectively recorded and then stored, window regions corresponding to programs with smaller utilization frequencies are placed further away the visible window, therefore, the terminal can automatically arrange the locations of the window regions according to the utilization frequencies of the user, and the use experience of the user is improved.

For example, selecting of the corresponding window regions for the application programs according to the running state of the system may include determining the running modes of the application programs; monitoring the running condition of the system, and specifying the corresponding window regions for the application programs when detecting that the running condition of the system accords with states required by the running modes of the application programs.

Further, the running condition of the system may comprise one or more items of the following information: location information, temperature information, state information of the visible region of the display screen, network linkage information, Bluetooth linkage state, Near Field Communication (NFC) linkage state, and/or the like.

For example, according to the state and the business capability of the present terminal system, an optimal experience mode is determined for the running of the application programs, and programs capable of running most perfectly in the current state are filtered out, and then are allocated to the corresponding window regions. For instance, the current system is in a horizontal screen state, and programs running in the horizontal screen mode may be filtered out by adopting the optimal experience mode, and then are allocated to the corresponding window region.

According to various embodiments of the present disclosure, the programs can be registered to run in which kind of optimal window region. Registered information is stored in a terminal system, and information registered by the programs can be added, deleted, or modified. Then, the terminal analyzes which application program may reach an optimal running mode through monitoring the capability state of the system, and then informs the application programs. When the running mode meets the optimal experience mode, the system allocates the application programs to the appointed window regions.

For example, the optimal experience mode may be automatically registered by the programs without participation of the user. Each program firstly reads a supported window region, and then knows that the system supports which kind of capabilities. Then, the optimal experience mode is set on the basis of the capabilities, and the set window regions may be standard windows, such as independent windows, and also be combined windows.

As discussed above in relation to FIG. 9, at operation S920, the terminal (e.g., electronic device) executes (e.g., runs) each application program in the associated program group in the corresponding window region according to the window resources. The window region comprises a visible region and a non-visible window of a display screen.

According to various embodiments of the present disclosure, at operation S920, running each application program in the associated program group in the corresponding window region according to the window resources may include running the application programs in the associated program group in the corresponding window regions in a combined mode.

According to various embodiments of the present disclosure, running the application programs in the associated program group in the combined mode may include running information of at least two levels in one application program in the corresponding window region, wherein information of at least one level runs outside the visible region of the display screen. In addition, or in the alternative, according to various embodiments of the present disclosure, running the application programs in the associated program group in the combined mode may include running at least two application programs in the associated program group in the corresponding window regions. The window region of each application program is equal to that of the visible region of the display screen in size.

Figure 12:
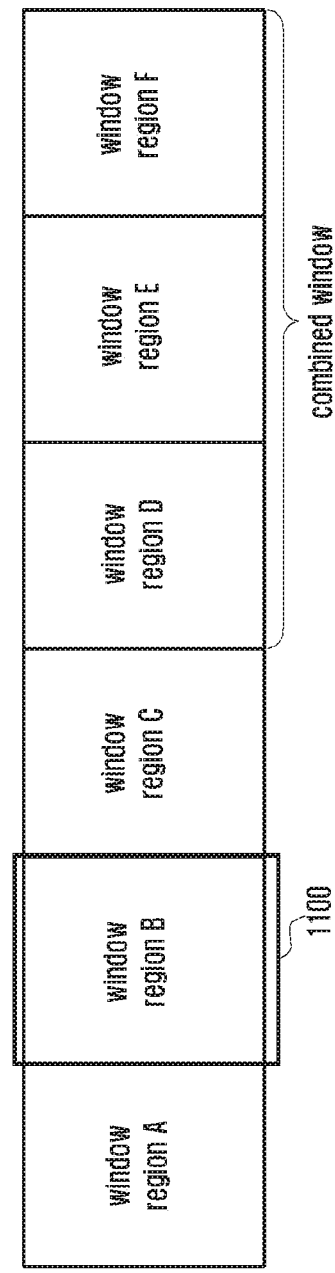
FIG. 12 is a schematic diagram illustrating that a width of a window is an integer multiple of a visible region of a display screen according to an embodiment of the present disclosure.

FIG. 12 is the schematic diagram illustrating that a width of a window is an integral multiple of a visible region of a display screen according to an embodiment of the present disclosure.

Referring to FIG. 12, in order to bring the convenience for switching all running application programs in the associated program group, window regions of all running application programs in the associated program group are switched to visible windows according to the preset arrangement sequence. For conveniently performing the description, the preset arrangement sequence of switching all window regions in the embodiment to the visible windows according to various embodiments of the present disclosure is marked by adopting a space arrangement sequence shown in FIG. 12 so that the space arrangement sequence of the window regions are used for simulating the switching sequence among the window regions. According to various embodiments of the present disclosure, as shown in FIG. 12, the window regions generally may run 6 or less than 6 application programs in parallel in a combined mode. For example, each running application program corresponds to one window region, wherein the window region A, the window region B and the window region C are three independent windows, the window region D, the window region E and the window region F form a combined window, the width of each independent window is equal to that of the visible region of the display screen, and the width of the combined window is equal to three times that of the visible region of the display screen. The independent windows only run one application program, and the combined window may run one or more application programs. Referring to FIGS. 4A to 4D, the window region B is used as the visible window to be displayed in the terminal screen 1100 (e.g., the window region B is the visible region of the display screen).

Information of at least two levels in one application program runs in parallel in the corresponding window regions, generally described as inter-program combination. According to various embodiments of the present disclosure, as illustrated in FIG. 12, the inter-application combination is realized in the combined window.

Figure 13:
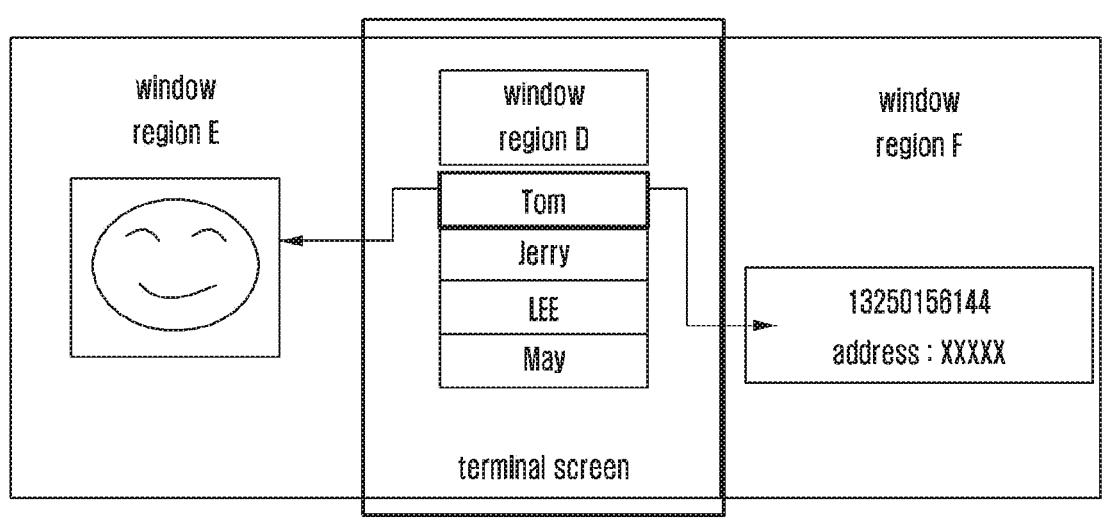
FIG. 13 is a schematic diagram of realizing inter-program combination in a combined window according to an embodiment of the present disclosure.

FIG. 13 is the schematic diagram of realizing the inter-program combination in the combined window according to an embodiment of the present disclosure.

Referring to FIG. 13, the window region D, the window region E and the window region F form the combined window. The arrangement sequence of all window regions in the combined window is shown in FIG. 13, sequentially the window region E, the window region D and the window region F from left to right. For instance, the application program displayed in the current combined window is a linkman program (e.g., a contact program, a social networking service program, and/or the like). The linkman program comprises names, images, addresses and cell phone numbers of linkmen, and/or the like. During specific running, the window region D is used as the visible window for displaying the names of the linkmen (e.g., contacts), content in the window region E are the images of the linkmen, and content in the window region F are the addresses and cell phone numbers, and/or the like of the linkmen. When the user selects name of any one linkman from the window region D in the terminal screen, the content in the window region E is the image of or otherwise associated with the linkman, the content in the window region F is address and cell phone number, and/or the like of the linkman. For example, the information of at least two levels in one application program runs in the corresponding window regions.

Referring to the FIG. 13 and the above description, according to an embodiment of the present disclosure, when the information of at least two levels in one application program runs in the corresponding window regions, the method further comprises the operation of, according to the operation of the user, when information running in the visible region of the display screen changes, information of other levels of the application programs correspondingly runs. As an example, the user may select in the window of the visible region, information in the non-visible region may be loaded according to the information selected by the user. For example, when needing to find address and cell phone number of a linkman Tom, the user firstly selects the linkman Tom in the visible window, the content in the window region F is correspondingly updated into the address and the cell phone number of the linkman Tom. Similarly, when needing to find address and cell phone number of a linkman Jerry, the user firstly selects the linkman Jerry in the visible window, and the content in the window region F is correspondingly updated into the address and the cell phone number of the linkman Jerry. When needing to read the address and the cell phone number of the linkman, the user switches the window region F to the visible region through a preset switching mode to be displayed in the terminal screen, thereby reading the address and the cell phone number of the linkman.

According to various embodiments of the present disclosure, although the information of all levels runs in the window regions respectively having the same size as the visible region. According to various embodiments of the present disclosure, information of one or more levels may also run in a region that is ½ or ⅓ of the window region of the visible region.

Running at least two application programs in the associated program group in the corresponding window regions generally also described as inter-program combination. According to the example illustrated in FIG. 12, application programs running in three independent windows of the window region A, the window region B and the window region C may run in an inter-program combination manner.

According to various embodiments of the present disclosure, when the at least two application programs in the associated program group run in the corresponding window regions, at least two application programs in the associated program group run in an independent mode. According to various embodiments of the present disclosure, when the at least two application programs in the associated program group run in the corresponding window regions, at least two application programs in the associated program group run in a cooperative mode.

According to various embodiments of the present disclosure, as shown in FIG. 12, the application programs running in the three independent windows of the window region A, the window region B and the window region C run in the inter-program combination manner. The application programs may run in an independent mode.

If at least two application programs in the associated program group run in a cooperative mode, then the application programs running in a cooperative mode have associated information. Associated information of the application program in the visible region of the display screen may be input data. When the input data changes, other application programs running in a cooperative mode correspondingly run according to the input data.

Figure 14:
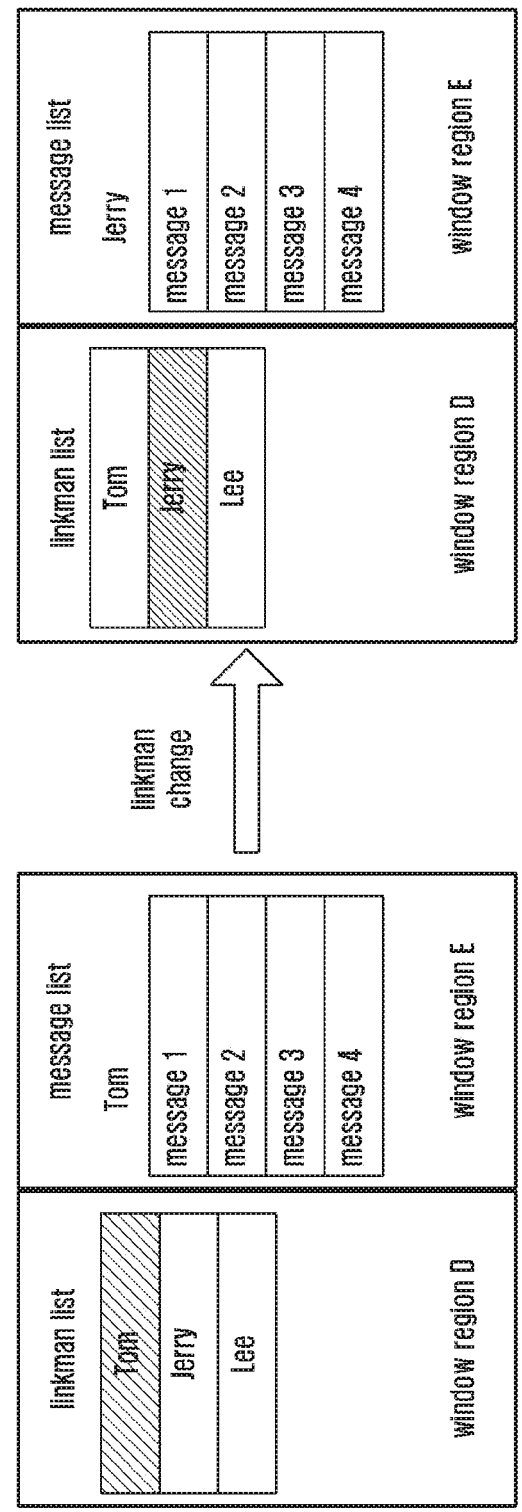
FIG. 14 is a schematic diagram that illustrates two application programs run in a cooperative mode according to an embodiment of the present disclosure.

FIG. 14 is the schematic diagram that illustrates two application programs run in a cooperative mode according to an embodiment of the present disclosure.

Referring to FIG. 14, the window region D and the window region E form a combined window. The window region D is a visible window (e., displayed in a visible region of the display screen); and the window region E is a non-visible window (e.g., an off-screen window). To be specific, the associated program group includes two application programs, one is a linkman program and the other one is a short message program. The two application programs (e.g., the linkman program and the short message program) run in a cooperative mode. The two application programs have some associated information. For example, the linkman program may record names, cell phone numbers, and/or the like of linkmen, and the short message program may record whether the information belongs to some linkman, cell phone number, and/or the like. Therefore, the two application programs at least have associated information: names or cell phone numbers of the linkmen. According to the operation of the user, when the running state of one application program changes, a linkman may be selected from a first application program linkman list. For example, as shown in left-hand side of the FIG. 14, the linkman Tom is selected. In response to a linkman being selected from the first application program linkman list, the other application program may correspondingly run according to the associated information. For example, in the second application program, information from the linkman Tom may be automatically displayed according to the associated information of the first application program, that is, the linkman Tom, in the second application program.

Various embodiment of the present disclosure may include setting at least two application program to run in a cooperative mode, setting at least one application program as an output application program of providing input data, setting at least one piece of associated information as the input data, and/or setting at least one application program as a cooperative application program of receiving the input data. When the application programs run in a cooperative mode, the cooperative application program correspondingly runs according to the change of the input data.

For example, when the terminal runs at least two programs, one corresponding window region is firstly generated for each application program, and possibly includes content of carrying out information interaction between the user and the application program corresponding to the window region, content in the window region comprise characters, pictures, moving cursor, and/or the like. When information of at least two application programs may be connected, the terminal can set all application programs the information of which may be connected as an associated program group. The window region of each application program in the associated program group can be an independent window, and the independent windows can be arranged randomly or according to the starting time of the application programs corresponding to the independent windows. The window regions of all application programs in the associated program group can be the combined windows arranged according to the preset arrangement sequence, and the window regions in the combined windows will be switched to the visible windows according to the preset arrangement sequence.

According to various embodiments of the present disclosure, one program in the associated program group is set as an output program, and a window region of the output program is set as a visible window, other programs in the associated program group are set as coroutines, and window regions of the coroutines are set as off-screen windows. When the user outputs user command information through the visible window of the output program, the coroutines generate relevant content in the corresponding off-screen windows thereof according to information of input data provided by the output programs. According to various embodiments of the present disclosure, as the coroutines update the content in the window regions in real time according to content and information displayed by the output programs, the content and the information displayed by the output programs may comprise input data. When the user switches to the coroutines from the output programs, the content in the visible windows of the coroutines have been updated in advance without re-inputting the user command information by the user, thus the user conveniently interacts information with the visible windows, and the intelligence of program running and the efficiency of using the programs by the user are improved. Preferably, as illustrated in FIG. 14, the input data provided by the output programs can be information selected by the user in the windows of the output programs, for example, in FIG. 14, information Tom selected by the user in the window region D. Preferably, the information displayed by the coroutines according to the input data provided by the output programs may include relevant information searched according to the input data.

Continuing to describe with the associated program group in FIG. 14 as an example, before the state shown in FIG. 14 is shown, the user or terminal system may set a cooperative mode for the application programs in the associated program group, set one application program corresponding to the visible window in the associated program group as an output program, and sets left application programs in the associated program group as coroutines. According to various embodiments of the present disclosure, linkmen of the application programs are in the visible window and are set as output programs, short messages are set as the coroutines, the output programs can output information to the coroutines, and the coroutines update content in the window regions thereof according to information received from the output programs in real time. Output interfaces of the output programs can be one or more, for example, including names, cell phone numbers, groups, dates, and/or the like of the linkmen. Input interfaces of the output programs can also be more, for example, including names, groups, dates, and/or the like of the linkmen of the short messages. When setting a cooperative mode for the application programs in the associated program group, the user or terminal system may set or select the output interfaces and the input interfaces. For example, when the input interfaces and the output interfaces are set as the names of the linkmen, the window region D is used as a linkman list displayed in the visible window, and the content in the window region E is a short message list of corresponding linkmen. When the user selects any one linkman therein through the window region D displayed in the terminal screen, content in the window region E are short messages of the linkmen. When the user needs to read the short messages of the linkmen, the user switches the window region E to the visible window through a preset switching mode to be displayed in the terminal screen, thereby reading the short messages of the linkmen.

Various embodiments of the present disclosure, after running each application program in the associated program group in the corresponding window region according to the window resources, may include installing the application programs in the corresponding window regions to run through one of the following modes of selecting the corresponding window regions for the application programs according to the setting of the user, selecting the corresponding window regions for the application programs according to the utilization frequencies of the application programs, and/or selecting the corresponding window regions for the application programs according to the running state of the system.

Figure 15:
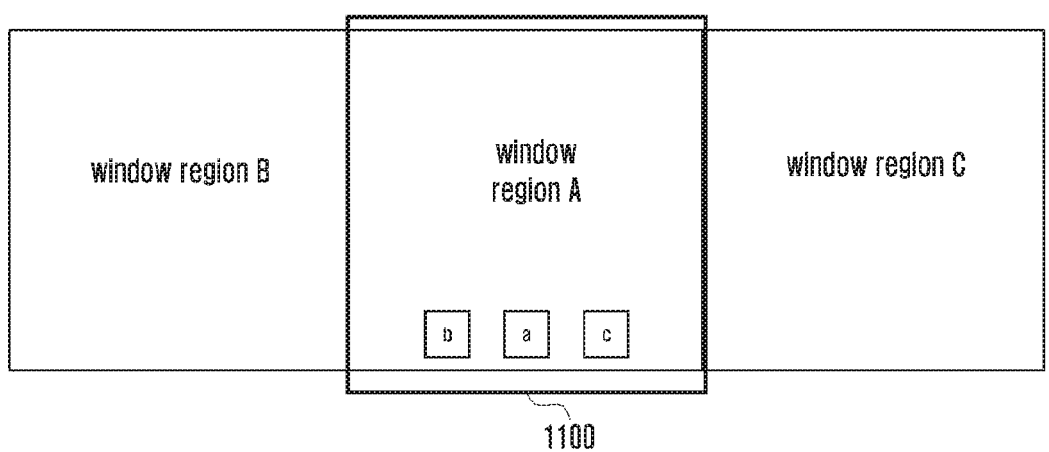
FIG. 15 is a schematic diagram that illustrates window regions of application programs are adjusted according to a setting of a user according to an embodiment of the present disclosure.

For example, the application programs in different window regions may be adjusted through the above introduced modes, and specifically described below by combining with the drawings:

The FIG. 15 is the schematic diagram that illustrates window regions of application programs are adjusted according to a setting of a user according to an embodiment of the present disclosure.

Referring to FIG. 15, the user can arrange locations of all window regions in the combined window through a key or touch screen in the terminal. As shown in FIG. 15, all window regions in the combined window are randomly arranged, sequentially a window region B, a window region A and a window region C from left to right, shortcut icons for marking the window regions are displayed in the terminal screen 1100 according to the arrangement sequence of the window regions, shortcut icons for marking the window region B, the window region A and the window region C are respectively an icon b, an icon a and an icon c, and the user can perform operations such as selecting, closing and drag-arranging on the window regions through the shortcut icons of the window regions. The window region A is a visible window to be displayed in the terminal screen 1100, and the window region B and the window region C are off-screen windows. If needing to change the arrangement sequence of the window regions in the combined window into an arrangement sequence of sequentially the window region B, the window region C and the window region A from left to right, the user drags the icon a and the icon c through a manual mode to ensure that the icon a and the icon c switch the locations to complete the location switching of the window region A and the window region C, thereby obtaining the arrangement mode of the window regions after adjustment as shown in FIG. 16.

Figure 16:
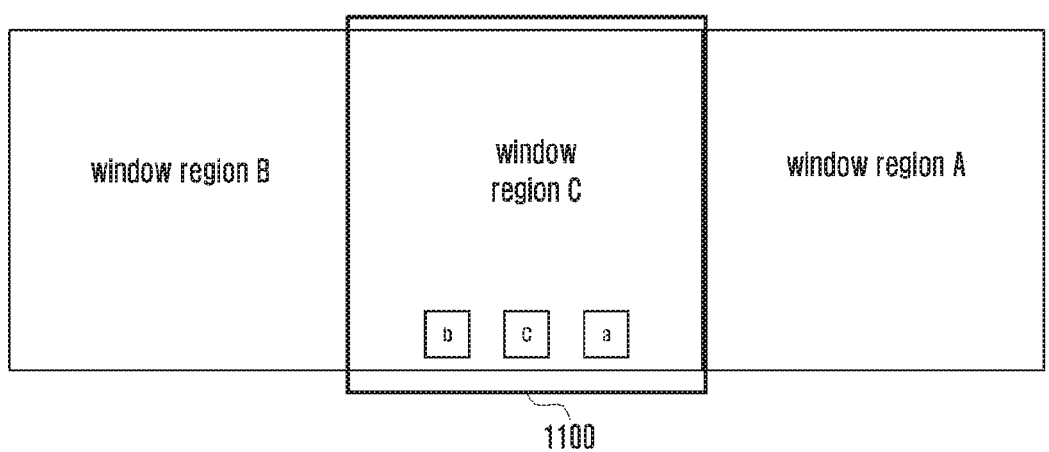
FIG. 16 is a schematic diagram of a window group after arrangement by adopting a selected arranging mode according to an embodiment of the present disclosure.

FIG. 16 is a schematic diagram of a window group after arrangement by adopting a selected arranging mode according to an embodiment of the present disclosure.

Referring to FIG. 16, a location relationship of three window regions can be recorded and then stored. When the terminal re-starts programs corresponding to the three window regions, the three window regions are arranged according to the arrangement mode as shown in FIG. 16, therefore the convenience is brought for arranging the window regions by the user according to a mode selected per se, and the use experience of the user is improved.

Figure 17:
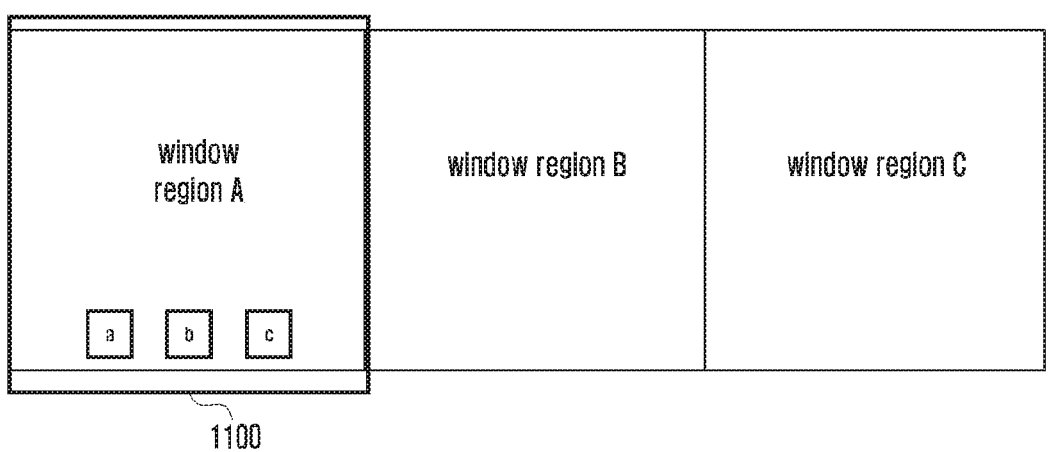
FIG. 17 is a schematic diagram of arranging virtual windows by adopting a frequency arrangement mode according to an embodiment of the present disclosure.

FIG. 17 is a schematic diagram of arranging virtual windows by adopting the frequency arrangement mode according to an embodiment of the present disclosure.

Referring to FIG. 17, all window regions in the combined window can be arranged by using the frequency arrangement sequence, and the technical scheme is introduced by using a program A, a program B and a program C in the embodiment as examples. In a process of using the terminal, utilization frequencies of the program A, the program B and the program C within a certain period are respectively recorded and then stored. For example, in a week, utilization frequencies of the program C, the program B and the program C are respectively 10 times, 8 times and 3 times. When the terminal re-runs the application program A, the application program B and the application program C, the window region A of the application program A with highest utilization frequency is set as the visible window, or the window region A of the application program A with highest utilization frequency is set in one side of other visible windows so as to bring the convenience for switching the window region A to the visible window by the user, and the window region B of the application program B and the window region C of the application program C, the utilization frequencies of which are sequentially reduced, are sequentially arranged. As shown in FIG. 17, the less the utilization frequencies are, the larger the distance between the window regions of the application programs and the visible window is, therefore, the terminal can automatically arrange the locations of the window regions according to the utilization frequencies of the user and the use experience of the user is improved.

According to various embodiments of the present disclosure, other application programs are sequentially arranged in two sides of the application program with highest utilization frequency according to the utilization frequencies of the application programs. According to various embodiments of the present disclosure, the application program directly started by the user is installed in the visible region of the display screen, and other application programs are sequentially installed in the non-visible window outside the visible region of the display screen according to the utilization frequency sequence.

According to various embodiments of the present disclosure, adjusting the corresponding window regions for the application programs according to the running state of the system may include determining running modes of the application programs, monitoring the running condition of the system, and adjusting the application programs to the corresponding window regions when detecting that the running condition of the system accords with the states required by the running modes of the application programs.

Further, the running condition of the system comprises one or more of location information, temperature information, state information of the visible region of the display screen, network linkage information, Bluetooth linkage state, NFC linkage state, and/or the like.

Figure 18:
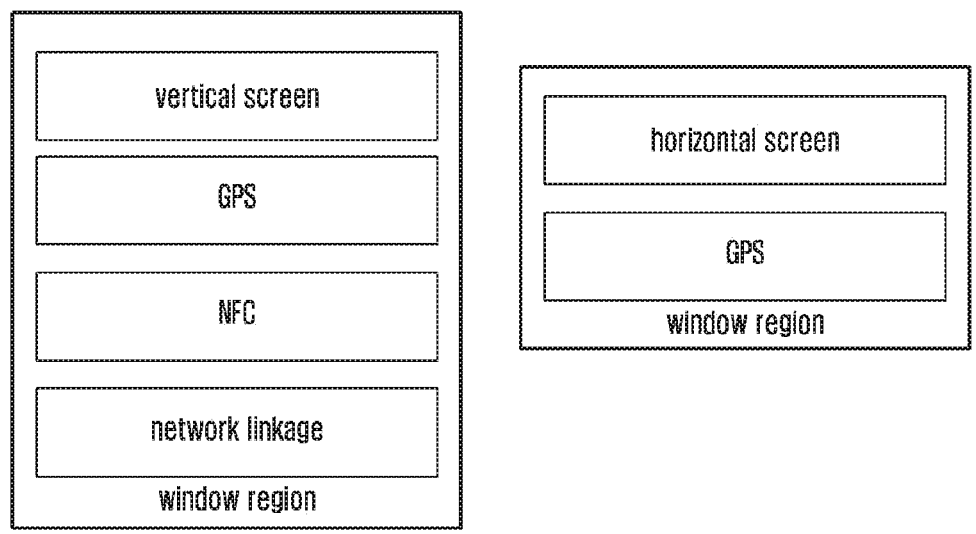
FIG. 18 is a schematic diagram of adjusting window regions according to a running state of a system according to an embodiment of the present disclosure.

FIG. 18 is the schematic diagram of adjusting window regions according to a running state of the system according to an embodiment of the present disclosure.

Referring to FIG. 18, when the visible region of the display screen of the terminal is in a vertical screen state and has Global Position System (GPS) receiving and NFC and network linkage, window regions selected by the application programs are shown in the left-hand side of the FIG. 18; and when the visible region of the display screen of the terminal is in a horizontal screen state and only has GPS receiving, window regions selected for application programs are shown in the right-hand side of the FIG. 18.

In addition, according to various embodiments of the present disclosure, the window regions can be arranged according to the experience of the user. The user can set user experience conditions for corresponding programs according to the use experience per se; and when the user experience conditions are met, the terminal (e.g., electronic device) will automatically arrange locations of window regions of the application programs in which the user experience conditions are set according to the preset arrangement sequence. For example, if the program A is a temperature alarm program, the user experience conditions are to remind the user of paying attention to the heatstroke prevention when the temperature of the neighboring environment is higher than 30° C., and the terminal can detect the temperature of the neighboring environment through a sensor arranged in the terminal. In summer, the terminal starts the program A and generates a window region A, now the window region A is an off-screen window, when the sensor in the terminal detects that the temperature of the neighboring environment is higher than 30° C., the window region A will be automatically switched to the visible window to be displayed in the terminal screen, and the user is reminded of observing the content in the visible window through modes such as flashlight, icon, ring or vibration; or, the window region A as the off-screen window is set in one side of the visible window, when the user needs to switch the current visible window to the off-screen window, the window region A will be firstly switched to the visible window to be displayed in the terminal screen so as to immediately remind the user of paying attention to the heatstroke prevention, therefore, the user conveniently arranges the locations of the window regions according to the user experience arrangement mode per se, and the use experience of the user is improved.

If corresponding user experience conditions are set in the program A, the program B and the program C, when the user experience conditions are met, window regions of the program A, the program B and the program C will be sequenced according to the preset arrangement sequence. For example, the window regions of the program A, the program B and the program C are sequentially far away from the visible window. As another example, the window region of the program A is set as the visible window, the window regions of the program B and the program C are sequentially arranged being far away from the visible window. As another example, the window regions of the program A, the program B, and the program C are all used as the visible windows to be displayed in the terminal screen, all visible windows can be displayed in a staggered overlapping manner by adopting a step mode, each visible window is displayed in a region in the terminal screen and comprises an effective interaction region, the effective interaction regions are not covered by other visible windows, and the user may select the visible windows in which the effective interaction regions are through the effective interaction regions, or performs the information interaction with application programs corresponding to the visible windows through the effective interaction regions.

Various embodiments of the present disclosure may include switching the application programs running in the non-visible window to run in the visible region of the display screen. Various embodiments of the present disclosure may include switching application programs running in the visible region to run in the non-visible window.

Further, the above switching can be performed according to the operation of the user, and also performed according to the running state of the system.

According to various embodiments of the present disclosure, switching the application programs running in the non-visible window to run in the visible region of the display screen or switching the application programs running in the visible region to run in the non-visible window according to the operation of the user may include executing the above switching through any one or more of slide-switching, shortcut icon-switching, key-switching, scroll-switching, and/or the like.

For example, in the visible region of the display screen, the user is reminded of the application programs running in the non-visible window, outside the visible region of the display screen. For example, the user is reminded of switching the non-visible window outside the visible region of the display screen to the visible region of the display screen in a mode of icons or status bars.

With the combined window comprising the window region A, the window region B and the window region C as an example below, the technical scheme is described by combining with the drawings, wherein the terminal screen is a touch screen with a touch function, the window region A is a visible window and the window region B and the window region C are distributed in two sides of the window region A before the switching is not performed by adopting the preset switching mode.

Figure 19:
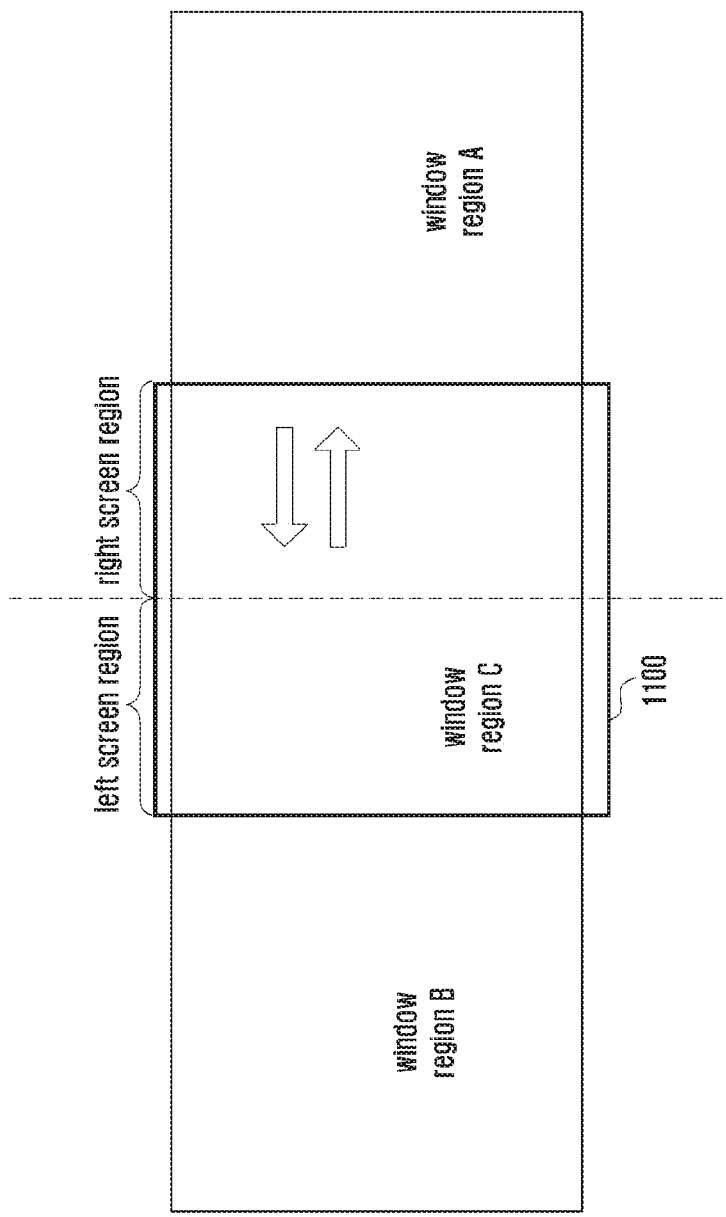
FIG. 19 is an operation schematic diagram of slide-switching a visible window and an off-screen window according to an embodiment of the present disclosure.

Referring to FIG. 19 is the operation schematic diagram of slide-switching a visible window and an off-screen window according to an embodiment of the present disclosure.

Referring to FIG. 19, the terminal screen 1100 may be divided into a left screen region and a right screen region by using a dividing line, and the sizes of the left screen region and the right screen region are same. A specific process of slide-switching the visible window and the off-screen window may include two fingers utilized to oppositely slide in the right screen region in the terminal screen, sliding directions of the two fingers are respectively directions indicated by two arrows in the right screen region for realizing the location switching of the window region A and the window region C. Similarly, if the locations of the window region B and the window region A are needed to be switched, the two fingers can be utilized to oppositely slide in the left screen region in the terminal screen 1100, and sliding directions of the two fingers are respectively directions indicated by two arrows in the left screen region for realizing the location switching of the window region A and the window region B.

Figure 20:
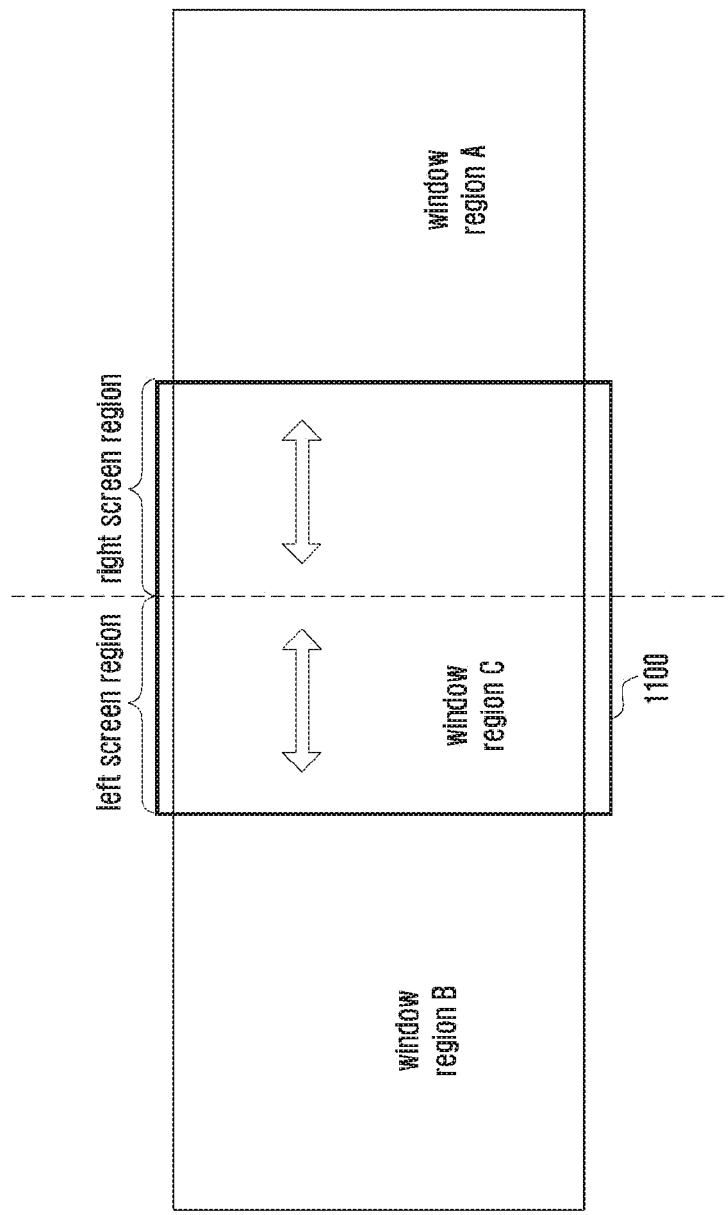
FIG. 20 is an operation schematic diagram of key-switching a visible window and an off-screen window according to an embodiment of the present disclosure.

FIG. 20 is an operation schematic diagram of key-switching a visible window and an off-screen window according to an embodiment of the present disclosure.

Referring to FIG. 20, when the user presses the terminal screen 1100 by using fingers or other hard objects (e.g., a stylus, or the like), the left screen region and the right screen region of the terminal screen respectively display a dual-array key, the user clicks the dual-arrow key in the left screen region, the window region B is switched to the visible window, the window region A is switched to the off-screen window; and if the user clicks the dual-arrow key in the right screen region, the window region C is switched to the visible window, and the window region A is switched to the off-screen window.

Figure 21:
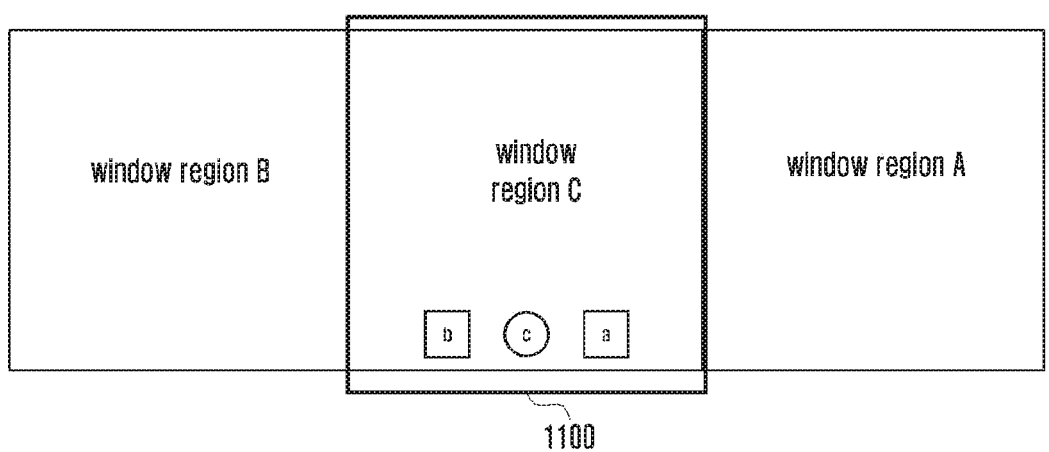
FIG. 21 is an operation schematic diagram of icon-switching a visible window and an off-screen window according to an embodiment of the present disclosure.

FIG. 21 is an operation schematic diagram of icon-switching a visible window and an off-screen window according to an embodiment of the present disclosure.

Referring to FIG. 21, the terminal screen 1100 displays shortcut icons of all window regions, shortcut icons of the window region A, the window region B and the window region C are respectively an icon a, an icon b and an icon c, and arrangement locations of the icon a, the icon b and the icon c are same as those of the corresponding window regions. When the window region C is needed to be switched to the visible window, the icon c is directly clicked in the terminal screen 1100. For example, the window region C is switched to the visible window, and the window region A is switched to the off-screen window. For conveniently selecting the corresponding window regions by the user, the shortcut icon of the visible window may be set to be circular, and the shortcut icon of the off-screen window may be set to be square.

Figure 22:
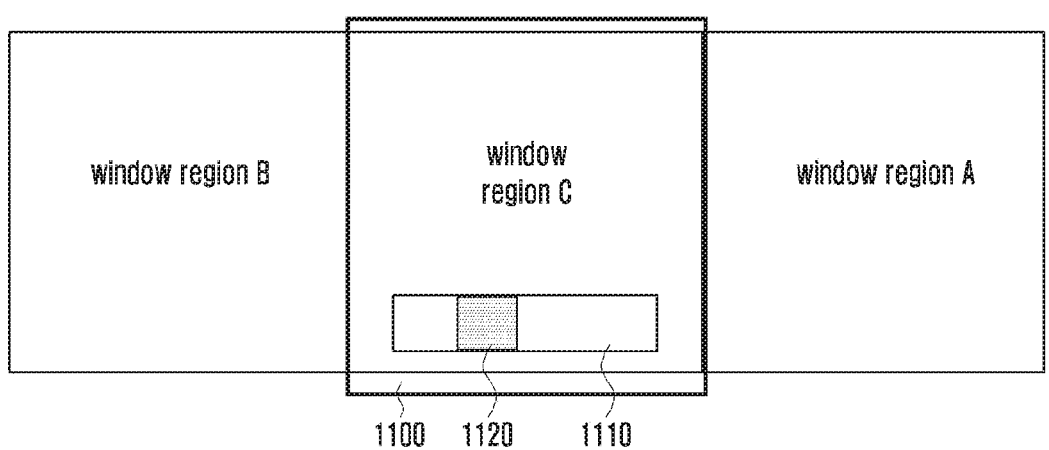
FIG. 22 is an operation schematic diagram of scroll-switching a visible window and an off-screen window according to an embodiment of the present disclosure.

FIG. 22 is an operation schematic diagram of scroll-switching a visible window and an off-screen window according to an embodiment of the present disclosure.

Referring to FIG. 22, when the user presses the terminal screen 1100 by using fingers or other hard objects (e.g., a stylus or the like), the lower part in the terminal screen 1100 will display one scroll bar 1110, a scroll cursor 1120 of the visible window is set in the middle of the scroll bar 1110. When the user presses the scroll cursor 1120 by using fingers to slide rightwards along the scroll bar 1110, the window region A is switched to the off-screen window, and the window region C is switched to the visible window. Similarly, when the user presses the scroll cursor 1120 by using fingers to slide leftwards along the scroll bar 1110, the window region A is switched to the off-screen window, and the window region B is switched to the visible window.

According to various embodiments of the present disclosure, application programs running in the non-visible window are also switched to run in the visible region of the display screen according to the running state of the system, or application programs running in the visible region are switched to run in the non-visible window. For example, the switching is defined as the condition switching. When the preset condition is met, the terminal screen will switch the visible window and the off-screen window to use the window region meeting the preset condition as the visible window to be displayed in the terminal screen. For example, the preset condition of switching the window region C to the visible window is that the terminal is placed in a horizontal screen state. When the user places the terminal from the vertical screen state to the horizontal screen state, the window region C will be automatically switched to the visible window, and the window region A is switched to the off-screen window when the terminal is placed in the vertical screen state; and when the user places the terminal from the horizontal screen state to the vertical screen state again, the window region C will be automatically switched to the off-screen window, and the window region A is automatically switched to the visible window.

According to various embodiments of the present disclosure, the visible window and the off-screen window are simply and rapidly switched by adopting modes such as slide-switching, icon-switching, key-switching, scroll-switching and condition-switching. According to various embodiments of the present disclosure, switching between the application programs corresponding to the off-screen window and the visible window is realized through switching the off-screen window and the visible window. As a result, the complicated operation of needing to exit the current application program is avoided, the interruption-free switching of the application programs is realized, the process of switching the application programs is simple and rapid, and the efficiency of switching the application programs is increased.

According to various embodiments of the present disclosure, the application program directly started by the user is generally displayed in the visible region of the display screen.

According to various embodiment of the present disclosure, the application programs running in the non-visible window are switched to run in the visible region of the display screen, including any one of the following modes of: covering partial visible region of the display screen by windows of the application programs running in the non-visible window; and covering all visible region of the display screen by the windows of the application programs running in the non-visible window.

Figure 23:
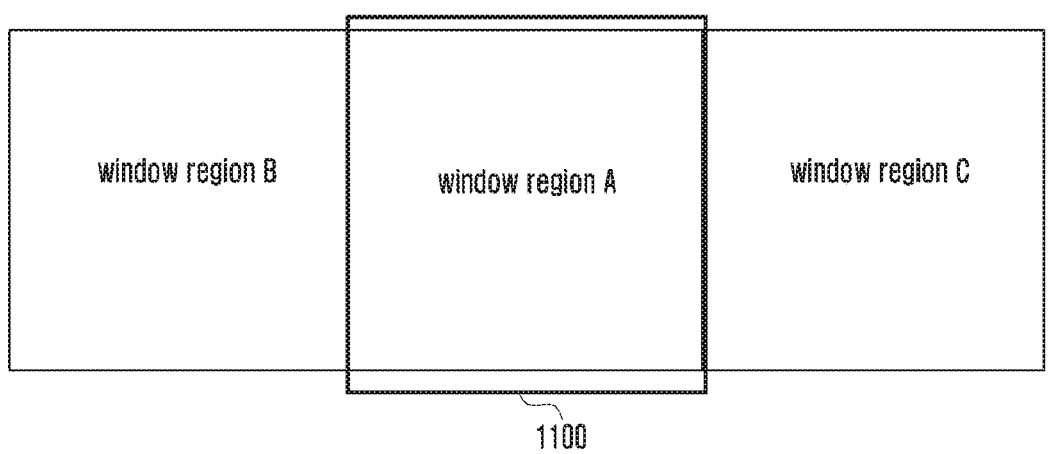
FIG. 23 is an arrangement schematic diagram of virtual windows before switching a visible window and an off-screen window according to an embodiment of the present disclosure.
Figure 24:
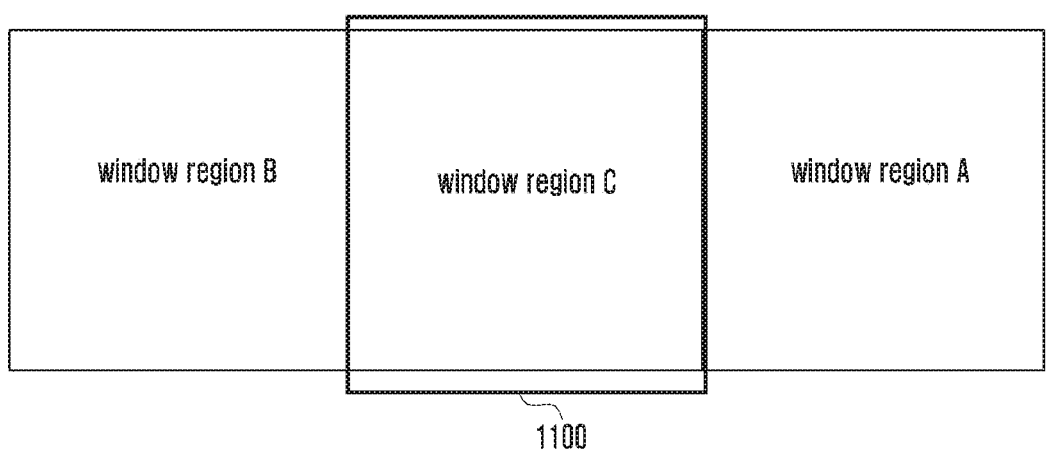
FIG. 24 is an arrangement schematic diagram of virtual windows after switching a visible window and an off-screen window by adopting an interchange mode according to an embodiment of the present disclosure.
Figure 25:
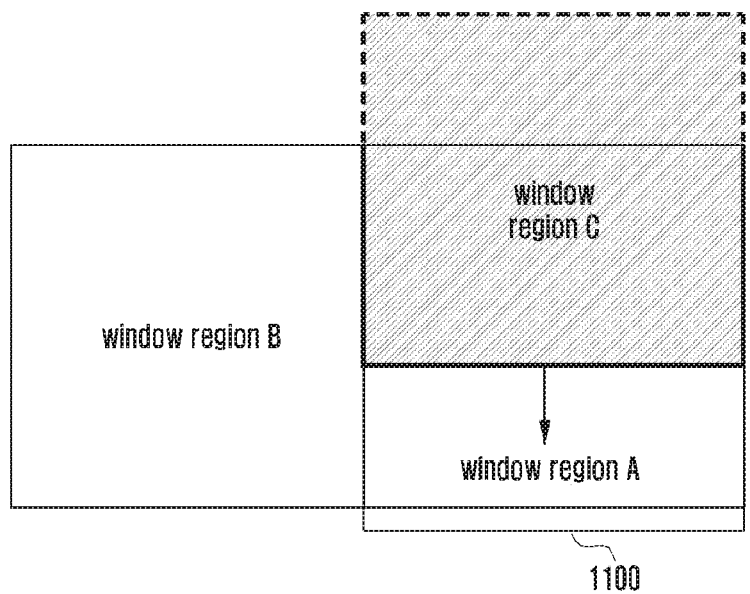
FIG. 25 is an arrangement schematic diagram of virtual windows after switching a visible window and an off-screen window by adopting a coverage mode according to an embodiment of the present disclosure.

FIG. 23 is an arrangement schematic diagram of virtual windows regions before switching a visible window and the off-screen window according to an embodiment of the present disclosure. FIG. 24 is an arrangement schematic diagram of virtual windows after switching a visible window and an off-screen window by adopting an interchange mode according to an embodiment of the present disclosure. FIG. 25 is an arrangement schematic diagram of virtual windows after switching a visible window and an off-screen window by adopting a coverage mode according to an embodiment of the present disclosure.

Referring to FIG. 23, the window region B, the window region A and the window region C are sequentially arranged, and the window region A is a visible region on the terminal screen 1100. Referring to FIG. 24, after the visible window and the off-screen window are switched by adopting the interchange mode, locations of the window region A used as the visible window and the window region used as the off-screen window are interchanged such that window region C is in the visible region of the terminal screen 1100. Referring to FIG. 25, after the visible window and the off-screen window are switched by adopting the coverage mode, the window region C may partially cover the window region A used as the visible window. The window region A and the window region C are both used as the visible windows on the terminal screen 1100 and both include effective interaction regions. The user can perform the information interaction with the running application programs corresponding to the visible windows through the effective interaction regions. After the visible window and the off-screen window are switched by adopting the coverage mode, the window region C all covers the window region A, and now the window region C becomes the visible window, and the user only performs the information interaction with the window region C.

Various embodiments of the present disclosure may include, when the window regions of the application programs change, updating location parameters of the window regions of the application programs.

In addition, various embodiments of the present disclosure may include recording the running state of each application program in the associated program group.

According to various embodiments of the present disclosure, the running states of the application programs comprise information for indicating whether the window regions of the application programs are displayed in the visible region of the display screen. Therefore, various embodiments of the present disclosure may include receiving a touch event, and transmitting the touch event to the application program displayed in the visible region of the display screen according to the running states of the application programs.

It can be obtained through comparison, although many terminals have achieved multi-task allocation and multi-task processing, the scheme provided by the present disclosure can effectively realize interruption-free switching of the application programs through recording location parameters, running states, interaction states and the like of the window regions of the application programs running in parallel, thus the process of switching the application programs is simple and rapid, the efficiency of switching the application programs is increased and the convenience is brought for the use of the user.

Various embodiments of the present disclosure further provide a device for managing multi-task application programs.

Figure 26:
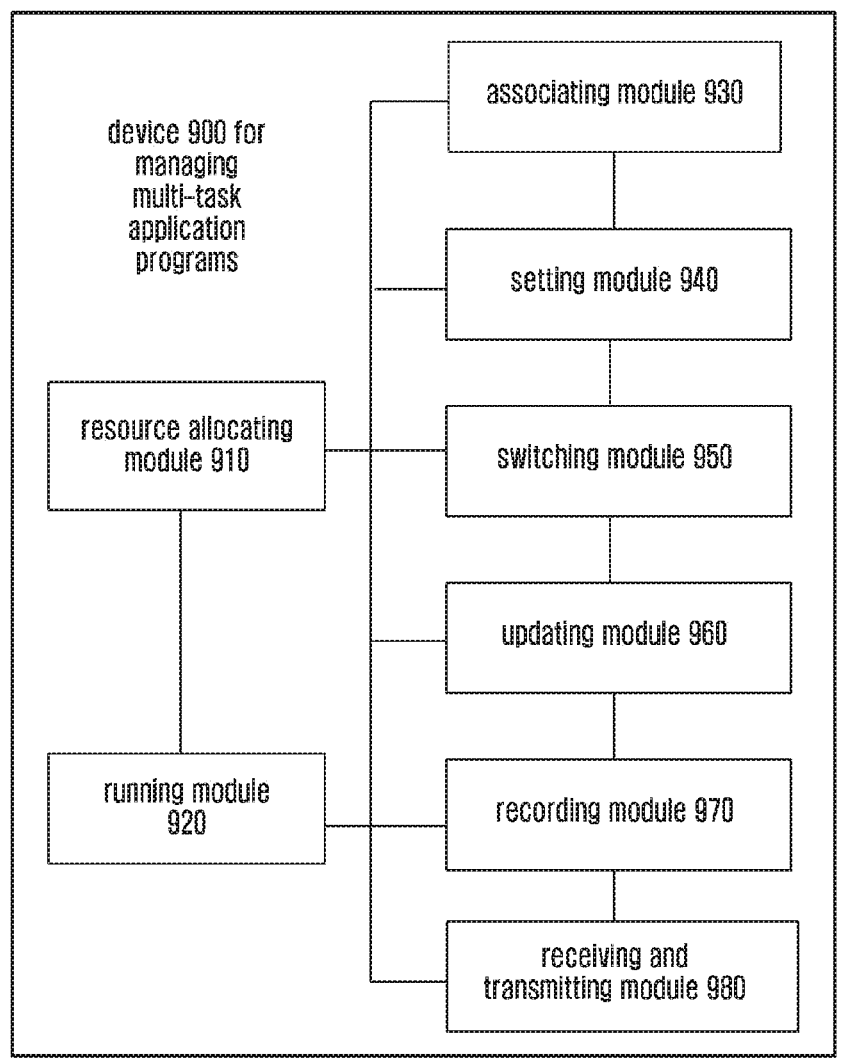
FIG. 26 is a structure schematic diagram of the device for managing multi-task application programs according to an embodiment of the present disclosure.

FIG. 26 is a structure schematic diagram of the device for managing multi-task application programs according to an embodiment of the present disclosure.

Referring to FIG. 26 the device 900 for managing the multi-task application programs may comprise a resource allocating module 910 and a running module 920.

According to various embodiments of the present disclosure, the resource allocating module 910 is used for allocating running resources and window resources to each application program in the associated program group when starting any one application program in the associated program group.

According to various embodiments of the present disclosure, the running module 920 is used for running each application program in the associated program group in the corresponding window region according to the window resources, wherein the window region comprises the visible region and the non-visible window of the display screen.

The resource allocating module 910 may be further used for allocating location parameters of the window regions.

The resource allocating module 910 may be further used for allocating window widths, window heights and coordinates of reference points of windows.

According to various embodiments of the present disclosure, the running module 920 may be specifically used for running the application programs according to the preset information when the window region in which the application programs run is the visible region or running the application programs according to operation information of the user. According to various embodiments of the present disclosure, the running module 920 is used for running the application programs according to information output by the application programs running in the visible region. According to various embodiments of the present disclosure, the running module 920 is used for running the application programs according to the mode of the application programs during running in the visible region. According to various embodiments of the present disclosure, the running module 920 is used for running the application programs according to the preset information when the window region in which the application programs run is the non-visible window.

According to various embodiments of the present disclosure, the device 900 for managing the multi-task application programs may further comprise an associating module 930.

According to various embodiments of the present disclosure, the associating module 930 is used for setting at least two application programs as an associated program group according to the choice of the user. According to various embodiments of the present disclosure, the associating module 930 is used for setting at least two application programs as an associated program group according to the predefined rule.

According to various embodiments of the present disclosure, the running module 920 is further used for running the application programs in the associated program group in a combined mode in the corresponding window regions according to the window resources.

According to various embodiments of the present disclosure, the running module 920 may be further used for running information of at least two levels in one application program in the corresponding window regions. Information of at least one level runs outside the visible region of the display screen. According to various embodiments of the present disclosure, the running module 920 may be further used for running at least two application programs in the associated program group in the corresponding window regions. The window region of each application program is equal to that of the visible region of the display screen in size.

When running the information of at least two levels in one application program in the corresponding window regions, the running module 920 is further used for correspondingly running information of other levels of the application program according to the operation of the user when the information running in the visible region of the display screen changes.

According to various embodiments of the present disclosure, the running module 920 may be further used for running at least two application programs in the associated program group in the corresponding window regions. According to various embodiments of the present disclosure, the at least two application programs in the associated program group run in an independent mode. According to various embodiments of the present disclosure, the at least two application programs in the associated program group run in a cooperative mode.

According to various embodiments of the present disclosure, the running module 920 may be further used for running the at least two application programs in the associated program group in a cooperative mode. The application programs running in a cooperative mode have associated information. The associated information of the application program in the visible region of the display screen is input data. When the input data changes, other application programs running in a cooperative mode correspondingly run according to the input data.

According to various embodiments of the present disclosure, the device 900 for managing the multi-task application programs may further comprise a setting module 940.

According to various embodiments of the present disclosure, the setting module 940 is used for setting at least two application programs to run in the cooperative mode;

According to various embodiments of the present disclosure, the setting module 940 is used for setting at least one application program as an output application program of providing the input data, setting at least one piece of associated information as the input data, and setting at least one application program as a cooperative application program of receiving the input data. When the application programs run in a cooperative mode, the cooperative application programs correspondingly run according to the change of the input data.

According to various embodiments of the present disclosure, the resource allocating module 910 may be further used for selecting the corresponding window regions for the application programs according to the setting of the user. According to various embodiments of the present disclosure, the resource allocating module 910 may be further used for selecting the corresponding window regions for the application programs according to utilization frequencies of the application programs. According to various embodiments of the present disclosure, the resource allocating module 910 is further used for selecting the corresponding window regions for the application programs according to the running state of the system.

According to various embodiments of the present disclosure, after running each application program in the associated program group in the corresponding window region, the running module 920 may be further used for installing the application programs in the corresponding window regions to run through any one of the following modes of selecting corresponding window regions for application programs according to the setting of the user, selecting corresponding window regions for application programs according to utilization frequencies of the application programs, and/or selecting corresponding window regions for application programs according to the running state of the system.

According to various embodiments of the present disclosure, the running module 920 is further used for installing an application program directly started by the user in a visible region of the display screen, and sequentially installing other application programs in a non-visible window outside the visible region of the display screen according to the utilization frequency sequence.

According to various embodiments of the present disclosure, the running module 920 may be further used for determining running modes of the application programs, and monitoring the running condition of the system, and specifying the corresponding window regions for the application programs when detecting that the running condition of the system accords with states required by the running modes of the application programs.

Further, the running condition of the system comprises one or more items of the following information: location information, temperature information, state information of the visible region of the display screen, network linkage information, Bluetooth linkage state, NFC linkage state, and/or the like.

According to various embodiments of the present disclosure, the device 900 for managing the multi-task application programs may further comprise a switching module 950.

According to various embodiments of the present disclosure, switching module 950 may be used for switching application program running in the non-visible window to run in the visible region of the display screen according to the operation of the user or the running state of the system.

According to various embodiments of the present disclosure, the switching module 950 may be used for switching application programs running in the visible region to run in the non-visible window according to the operation of the user or the running state of the system.

Moreover, the switching module 950 may be further used for switching the non-visible window to the visible region of the display screen through any one of the following modes of: slide-switching, shortcut icon-switching, key-switching, scroll-switching, condition-switching, and/or the like.

Moreover, the switching module 950 may be further used for reminding the user of the application programs running in the non-visible window, which are installed outside the visible region of the display screen, in the visible region of the display screen.

According to various embodiments of the present disclosure, the switching module 950 is further used for covering the non-visible window in partial visible region of the display screen, or covering the non-visible window in all visible region of the display screen.

According to various embodiments of the present disclosure, the running module 920 is further used for displaying the application program directly started by the user in the visible region of the display screen.

According to various embodiments of the present disclosure, the device 900 for managing the multi-task application programs may further comprise an updating module 960.

According to various embodiments of the present disclosure, the updating module 960 may be used for updating location parameters of window regions of application programs when the window regions of the application programs change.

According to various embodiments of the present disclosure, the device 900 for managing the multi-task application programs may further comprise a recording module 970.

According to various embodiments of the present disclosure, the recording module 970 may be used for recording the running state of each application program in the associated program group.

According to various embodiments of the present disclosure, the recording module 970 may be used for recording the running state including information for indicating whether the window regions of the application programs are displayed in the visible region of the display screen or not;

According to various embodiments of the present disclosure, the device 900 for managing the multi-task application programs may further comprise a receiving and transmitting module 980. The receiving and transmitting module 980 may be used for receiving a touch event, and transmitting the touch event to the application program displayed in the visible region of the display screen according to the running state of the application program.

When running the application programs in the associated program group, the above device disclosed by the various embodiments of the present disclosure allocates running resources and window resources to each running program, and is capable of realizing switching between the application programs respectively corresponding to the visible region and the non-visible window of the display screen through switching the visible region and the non-visible window of the display screen to ensure that the process of switching the application programs by the terminal is simple and rapid, the efficiency of switching the application programs is increased, the complicated operation of needing to exit the current application program is avoided, the interruption-free switching on the application programs is realized, and the convenience of using the application programs by the user is improved.

In the applications, the above disclosed method is generally adopted by an electronic device (e.g., a terminal device), or the above disclosed device for inputting information forms one part of the electronic device (e.g., the terminal device).

Figure 27:
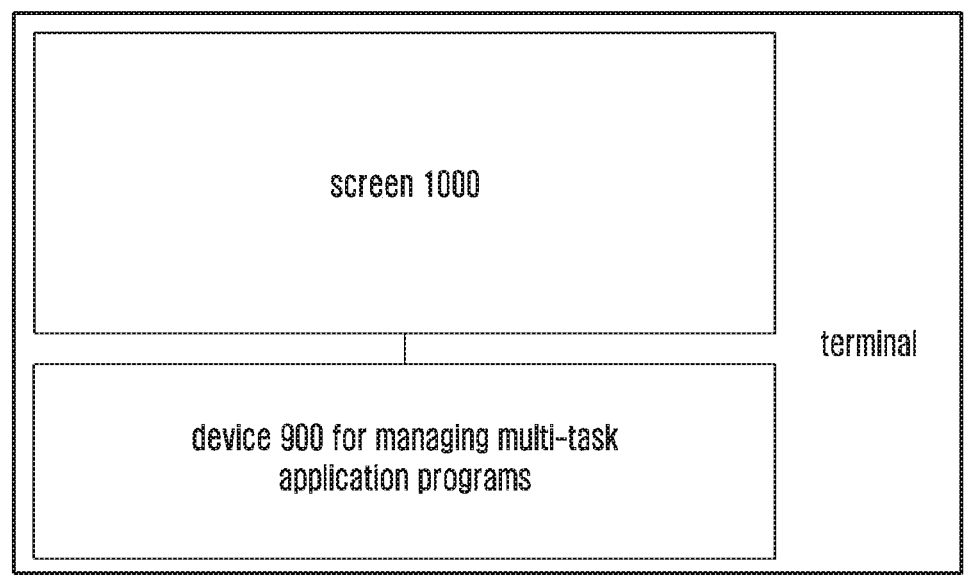
FIG. 27 is a structure schematic diagram of a terminal according to an embodiment of the present disclosure.

FIG. 27 is the structure schematic diagram of a terminal of the present disclosure according to an embodiment of the present disclosure.

Referring to FIG. 27, the terminal comprises a screen 1000 and a device 900 for managing the multi-task application programs according to the various embodiments of the present disclosure. The device 900 for managing the multi-task application programs in the terminal is capable of realizing the switching between the running application programs corresponding to the off-screen window and the visible window through switching the off-screen window and the visible window to ensure that the process of switching the running application programs by the terminal is simple and rapid and the efficiency of switching the running application programs is increased.

A person skilled in the art can understand that the present disclosure may involve devices for carrying out one or more the operations as described in the present application. The devices can be specially designed and manufactured as required, or can include well known equipment in a general-purpose computer which stores programs that are selectively activated or reconstructed. Computer programs as such can be stored in non-transitory device-readable media (e.g., a non-transitory computer-readable storage medium) or in any type of medium suitable for storing electronic signaling and respectively coupled to a bus, the non-transitory computer-readable medium includes but not limited to any type of disk (including floppy disk, hard disk, optical disk, CD-ROM, magneto optical disk, and/or the like), Random Access Memory (RAM), Read Only Memory (ROM), electrically programmable ROM, Electrically Erasable ROM (EE-ROM), Electrically Erasable Programmable ROM (EEPROM), flash memory, magnetic card, optical line card, and/or the like. Readable media include any mechanism for storing or transmitting information in a device-readable (e.g., computer-readable) form. For instance, readable media include RAM, ROM, magnetic disk storage medium, optical storage medium, flash memory apparatus, signals (such as carriers, infrared signals, digital signals) that travel in an electrical, optical, acoustic, or other form.

It should be understood by a person skilled in the art that computer program instructions can be used to realize these structural diagrams and/or each block in block diagrams and/or flow charts as well as a combination of these structural diagrams and/or blocks in the block diagrams and/or flow diagrams. These computer program instructions can be provided to general purpose computers, special purpose computers or other processors of programmable data processing means to produce a machine, so that the instructions are executed by the computers or the processors of programmable data processing means to create a designated method for effecting the structural diagram and/or a block or blocks of block diagrams and/or flow diagrams.

A person skilled in the art can understand that the operations, the methods, the steps in the flows, the measures, the schemes discussed in the present disclosure can be replaced, changed, combined or deleted. Further, the operations, the methods, the other steps in the flows, the measures, the schemes discussed in the present disclosure can also be replaced, changed, rearranged, combined or deleted. Further, prior arts having the operations, the methods, the other steps in the flows, the measures, the schemes discussed in the present disclosure can also be replaced, changed, rearranged, combined or deleted.

The descriptions hereinabove are only part of various embodiments of this present disclosure. It should be pointed out that to a person skilled in the art, under the circumstance without deviating from the principle of the present disclosure, he can also make several improvements and modifications, where these improvements and modifications should also be deemed falling within the protection scope of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for displaying information, the method comprising:
    executing, in response to executing of a first application associated with a contact in a visible window, a second application associated with the contact in a non-visible window;
    displaying, by at least one processor, a first entity for displaying first information of the contact corresponding to the first application in a first area and a second entity for displaying second information of the contact corresponding to the second application;
    selecting, by the at least one processor, the second entity for displaying the second information;
    receiving, by the at least one processor, the second information from the second application executed in the non-visible window; and
    displaying, by a display, the received second information in a second area.

2. The method of claim 1, wherein the displaying of the received second information comprises:
    matching information with the first information; and
    displaying, based on the selection of the second entity, detailed information associated with the second entity in the second area.

3. The method of claim 2, wherein the displaying of the first area and the second area comprises matching the first entity of the first application of the first area with the second entity of the second application of the second area.

4. The method of claim 2, wherein the displaying of the detailed information associated with the second entity in the second area comprises displaying the detailed information based on a result of a search of information associated with the second entity.

5. The method of claim 4, wherein the detailed information is organized for display based upon a parameter extracted from the second area and the first area.

6. The method of claim 1, wherein a capability associated with the second area defines an application.

7. The method of claim 6, wherein the application is a contacts application.

8. An electronic device for displaying information, the electronic device comprising:
    a display;
    a memory configured to store instructions; and
    at least one processor electrically coupled to the display and the memory, the at least one processor when executing the stored instructions is configured to:
        execute, in response to executing of a first application related to a contact in a visible window, a second application associated with the contact in a non-visible window,
        display a first entity for displaying first information of a contact corresponding to the first application in a first area and a second entity for displaying second information of the contact corresponding to the second application, select the second entity for displaying the second information, receive the second information from the second application executed in the non-visible window, and control to display the received second information in a second area.

9. The electronic device of claim 8, wherein the at least one processor is further configured to:

match information with the first information, and display, based on the selection of the second entity, detailed information associated with the second entity in the second area.

10. The electronic device of claim 9, wherein the at least one processor is further configured to match the first entity of the first application of the first area with the second entity of the second application of the second area when displaying the first area and the second area.

11. The electronic device of claim 9, wherein the at least one processor is further configured display the detailed information based on a result of a search of information associated with the second entity.

12. The electronic device of claim 11, wherein the detailed information is organized for display based upon a parameter extracted from the second area and the first area.

13. The electronic device of claim 8, wherein a capability associated with the second area defines an application.

14. The electronic device of claim 13, wherein the application is a contacts application.

15. A non-transitory computer readable storage medium with instructions stored thereon, the instructions, when executed by at least one processor, perform a method for displaying information, the method comprising:

executing, in response to executing of a first application related to a contact in a visible window, a second application associated with the contact in a non-visible window, displaying, by the at least one processor, a first entity for displaying first information of the contact corresponding to the first application in a first area and a second entity for displaying second information of the contact corresponding to the second application;

selecting, by the at least one processor, the second entity for displaying the second information;

receiving, by the at least one processor, the second information from the second application executed in the non-visible window; and displaying, by a display, the received second information in a second area.

16. The non-transitory computer readable storage medium of claim 15, further comprising:

matching information with the first information; and displaying, based on the selection of the second entity, detailed information associated with the second entity in the second area.

\* \* \* \* \*